United States Patent
Orion et al.

(10) Patent No.: US 7,984,269 B2
(45) Date of Patent: Jul. 19, 2011

(54) DATA PROCESSING APPARATUS AND METHOD FOR REDUCING ISSUE CIRCUITRY RESPONSIBILITY BY USING A PREDETERMINED PIPELINE STAGE TO SCHEDULE A NEXT OPERATION IN A SEQUENCE OF OPERATIONS DEFINED BY A COMPLEX INSTRUCTION

(75) Inventors: Luc Orion, Mouans Sartoux (FR); Cédric Denis Robert Airaud, Saint Laurent du Var (FR); Boris Sira Alvarez-Heredia, Juan-les-Pins (FR)

(73) Assignee: ARM Limited, Cambridge (GB)

( * ) Notice: Subject to any disclaimer, the term of this patent is extended or adjusted under 35 U.S.C. 154(b) by 640 days.

(21) Appl. No.: 11/808,763

(22) Filed: Jun. 12, 2007

(65) Prior Publication Data
US 2008/0313435 A1  Dec. 18, 2008

(51) Int. Cl.
*G06F 9/30* (2006.01)
(52) U.S. Cl. ........................................................ 712/214
(58) Field of Classification Search .................. 712/214, 712/216, 217, 218
See application file for complete search history.

(56) References Cited

U.S. PATENT DOCUMENTS

| | | | |
|---|---|---|---|
| 5,991,531 A * | 11/1999 | Song et al. | 703/26 |
| 6,272,616 B1 * | 8/2001 | Fernando et al. | 712/20 |
| 7,502,914 B2 * | 3/2009 | Dhodapkar | 712/214 |
| 2005/0132345 A1 * | 6/2005 | Pessolano | 717/159 |
| 2006/0095732 A1 * | 5/2006 | Tran et al. | 712/217 |

* cited by examiner

*Primary Examiner* — David J Huisman
(74) *Attorney, Agent, or Firm* — Nixon & Vanderhye P.C.

(57) ABSTRACT

A data processing apparatus and method are provided for executing complex instructions. The data processing apparatus executes instructions defining operations to be performed by the data processing apparatus, those instructions including at least one complex instruction defining a sequence of operations to be performed. The data processing apparatus comprises a plurality of execution pipelines, each execution pipeline having a plurality of pipeline stages and arranged to perform at least one associated operation. Issue circuitry interfaces with the plurality of execution pipelines and is used to schedule performance of the operations defined by the instructions. For the at least one complex instruction, the issue circuitry is arranged to schedule a first operation in the sequence, and to issue control signals to one of the execution pipelines with which that first operation is associated, those control signals including an indication of each additional operation in the sequence. Then, when performance of the first operation reaches a predetermined pipeline stage in that execution pipeline, that predetermined pipeline stage is arranged to schedule a next operation in the sequence, and to issue additional control signals to a further one of the execution pipelines with which that next operation is associated in order to cause that next operation to be performed. This has been found to provide a particularly efficient mechanism for handling the execution of complex instructions without the need to provide dedicated execution pipelines for those complex instructions, and without an increase in complexity of the issue circuitry.

16 Claims, 13 Drawing Sheets

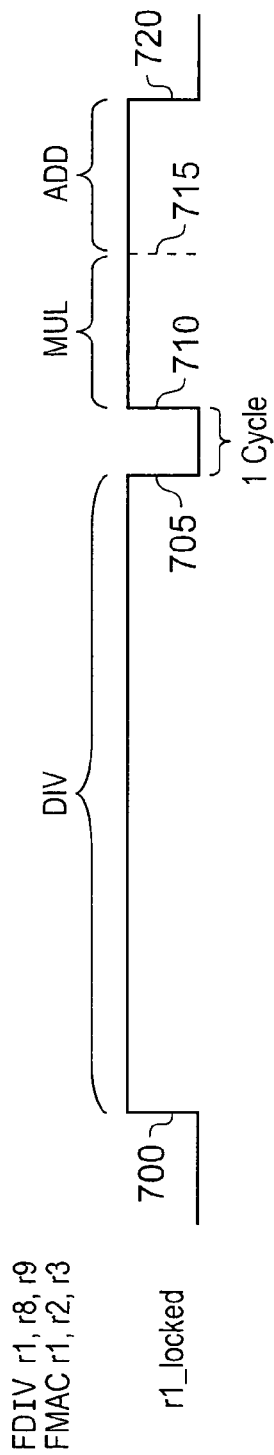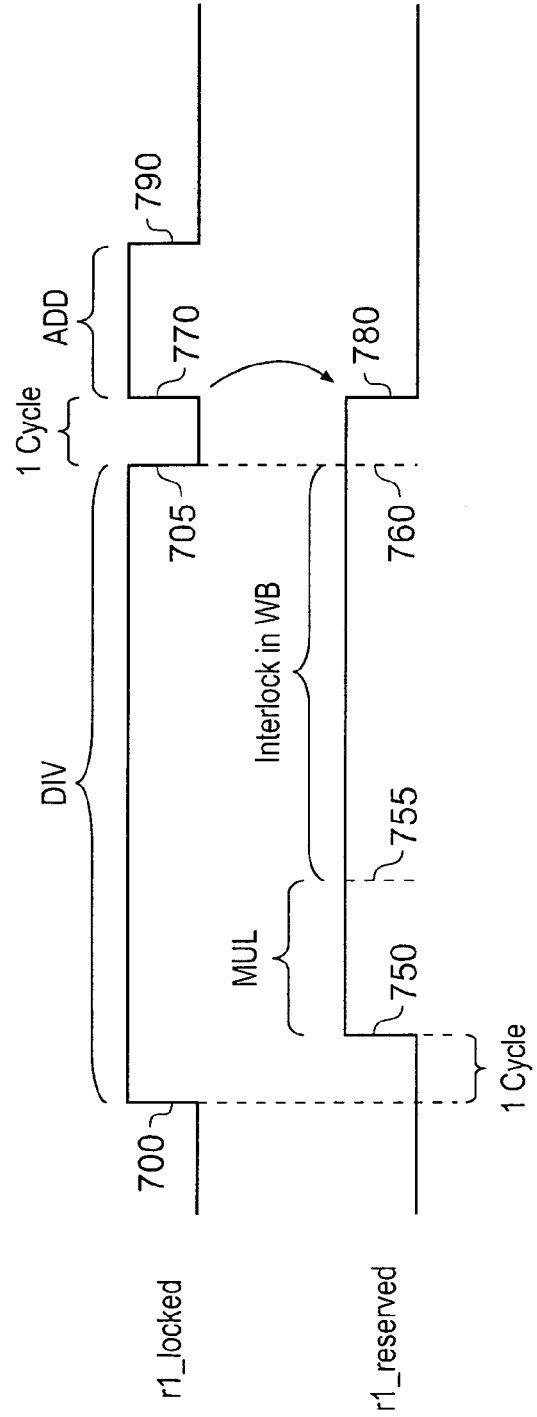
FIG. 11A
FIG. 11B

DATA PROCESSING APPARATUS AND METHOD FOR REDUCING ISSUE CIRCUITRY RESPONSIBILITY BY USING A PREDETERMINED PIPELINE STAGE TO SCHEDULE A NEXT OPERATION IN A SEQUENCE OF OPERATIONS DEFINED BY A COMPLEX INSTRUCTION

BACKGROUND OF THE INVENTION

1. Field of the Invention

The present invention relates to techniques for executing complex instructions within a data processing apparatus.

2. Description of the Prior Art

Many data processing apparatus include one or more pipelined execution units (also referred to herein as execution pipelines) for performing operations defined by instructions executed on the data processing apparatus. Often, a plurality of execution pipelines may be provided, each pipeline being designed to perform one or more associated operations. For example, a multiplier pipeline may be designed to perform multiply operations defined by multiply instructions, an arithmetic logic unit (ALU) pipeline may be provided for performing various arithmetic operations (such as add, subtract, etc) defined by arithmetic instructions, a divide/square root pipeline may be provided for performing divide and square root operations identified by divide or square root instructions, etc. When designing a data processing apparatus with a plurality of execution pipelines, it is typically the case that all of the pipelines are designed such that their latency is as low as possible, and generally it is desirable for all of the pipeline lengths to be balanced.

Often the instructions to be executed by the data processing apparatus may include one or more complex instructions, a complex instruction defining a sequence of operations to be performed in response to that single complex instruction. As an example, a floating point multiply accumulate (FMAC) instruction may specify a multiply operation, followed by an accumulate operation, to be performed in respect of floating point operands.

One way of seeking to deal with such complex instructions is to provide an execution pipeline that can handle the sequence of operations defined by the complex instruction. Accordingly, taking the above FMAC example, a single execution pipeline could be designed that would be able to perform the multiply operation followed by the required accumulate operation. Since the accumulate operation cannot be performed until the result of the multiply operation is produced, such an approach can lead to a relatively long pipeline. Purely by way of illustration, if four cycles are required to perform the multiply operation and a further four cycles are required to perform the accumulate operation, then it may take eight cycles for such a dedicated multiply-accumulate execution pipeline to perform the required operations defined by an FMAC instruction. To avoid unnecessary proliferation of hardware, it may also be desired to pass simple add instructions or simple multiply instructions to the same execution pipeline, but by using a dedicated execution pipeline capable of handling a multiply-accumulate operation, this would then mean that simple multiply instructions or add instructions would also take the same number of cycles to execute as an FMAC instruction, for example eight cycles for the above illustrated example.

FIG. 1 illustrates schematically the above mentioned approach of designing a complex execution pipeline that can perform all of the required operations defined by a complex instruction. In this case, six pipeline stages 20, 30, 40, 50, 60, 70 are provided within the execution pipeline, with the final stage 70 being a write back (WB) stage used to write the result to a destination register in the register bank 90. Typically, issue stage circuitry 10 is provided for scheduling instructions for execution. To schedule an instruction, one or more checks will be performed to determine whether the operation (or the operations) defined by a particular instruction can currently be performed. Hence, for example, for an instruction whose defined operation(s) need to be performed by the pipeline shown in FIG. 1 consisting of the six pipeline stages 20, 30, 40, 50, 60, 70, it will be necessary for the issue stage circuitry 10 to determine that the execution pipeline is ready to receive a new operation before the operation can be dispatched to that execution pipeline. Also, it will be necessary to check that the source and destination registers required when executing the instruction are available, this check often being referred to as an interlock check.

Typically, the issue stage circuitry 10 will reference scoreboard circuitry 80 in order to carry out the required checks to enable operations to be scheduled. Hence, the issue stage circuitry 10 can identify to the scoreboard circuitry the source and destination registers required when executing a particular instruction, and the scoreboard circuitry can check that those registers are available for access without giving rise to any interlock issues. When a particular instruction is to be executed, one or more of the registers referenced when accessing that instruction can be marked as locked within a record of registers maintained by the scoreboard circuitry 80, typically this being done in response to a lock request issued by the issue stage circuitry 10. Whilst a particular register is locked, its contents cannot be accessed in connection with a later instruction, and accordingly if any of the source or destination registers required for a particular instruction are locked, the issue stage circuitry 10 will typically stall execution of that instruction until the required registers are available. However, when the various source and destination registers required are available, and assuming there is no other reason to stall an instruction (for example due to the fact that the required execution pipeline is not ready), then the issue stage circuitry 10 can schedule that instruction for execution, at which point the issue stage circuitry 10 will typically issue a lock request to the scoreboard circuitry to cause at least the destination register to be locked, whereafter the required control signals can be sent to the relevant execution pipeline to cause the required operation or operations defined by that instruction to be performed. When the write back stage 70 is reached, any locked registers can then be unlocked assuming the register bank 90 is available to accept the result value for storing therein. This may not always be the case, since in any particular embodiment the number of write ports to the register bank 90 may be less than the number of execution pipelines, and hence on occasions the register bank may not be ready to accept a result value produced by an execution pipeline, in which case writing of that result value, and unlocking of the relevant register(s) in the scoreboard circuitry 80, will be delayed.

By constructing a complex execution pipeline such as shown in FIG. 1 that is able to perform the sequence of operations defined by a complex instruction, this provides a simple solution from the issue stage point of view, as the issue stage 10 can treat the complex instruction as a single instruction, hence requiring access to the scoreboard circuitry only once. However, as mentioned earlier, a disadvantage of such an approach is that the pipeline depth is increased, which increases the execution time for certain simple instructions, as a result of which such simple instructions have worse latency.

Various studies have been performed with the aim of seeking to reduce the pipeline depth of such complex execution pipelines. For example, considering multiply-accumulate operations, some optimizations have been proposed which can reduce the length of the pipeline due to certain architecture choices that allow faster rounding, or no rounding, between the multiply and accumulate operations. Other optimizations have enabled the result of the multiply to be immediately used by the add operation, eliminating an intermediate step normally required when the multiply result is written to a register. Whilst such steps can somewhat alleviate the potential increase in pipeline depth, such complex execution pipelines still have a larger pipeline depth than would be required merely having regards to execution of simple instructions that might be allocated to that pipeline, and accordingly still give rise to latency issues with regards to the execution of such simple instructions.

An alternative solution for handling complex instructions is to not provide a complex execution pipeline for handling the sequence of operations defined by complex instructions, but instead to retain multiple execution pipelines that are each able to handle the operations required by simple instructions, such an approach being illustrated schematically in FIG. 2. In this example, a first pipeline has three pipeline stages 110, 120, 130, and a further pipeline also has three pipeline stages 170, 180, 190. Considering the earlier example of multiply and add instructions, the first pipeline may be able to perform multiply operations, and the second pipeline may be able to perform add operations. However, neither pipeline by itself can handle the multiply and accumulate operations defined by a multiply-accumulate instruction. To enable such complex instructions to be handled, the issue stage circuitry 100 needs to be modified to enable such complex instructions to in effect be broken down into a series of constituent simple instructions.

Hence, when the issue stage circuitry 100 receives control signals identifying a decoded multiply-accumulate instruction, it needs to schedule a multiply operation in the first pipeline with reference to the scoreboard circuitry 140, taking into account the source registers and any destination register specified for that multiply operation, and separately needs to retain in a FIFO structure 105 a record of the subsequent add instruction required and any source or destination registers applicable to that add instruction. When the multiply operation has completed, the issue stage circuitry 100 will then need to reference the scoreboard circuitry 140 again in order to schedule the next operation stored in the FIFO 105, in the above example the add operation, and then forward the appropriate control signals for that add operation to the second execution pipeline. One or more of the source operands required for the add operation may be forwarded directly from the issue stage circuitry 100, for example by the issue stage circuitry reading the required values out of the register bank 150. In addition, the write back stage 130 in the first execution pipeline may be arranged to have a forwarding path to enable the result produced by that execution pipeline to be forwarded directly via the logic 160 into the first pipeline stage 170 of the second execution pipeline.

As before, the write back stages 130, 190 in the various execution pipelines can be arranged to reference the scoreboard circuitry 140 to unlock registers that had previously been locked in connection with the operations being performed by their respective pipelines.

Whilst this approach can reduce the latency associated with the execution of simple instructions, whilst still enabling complex instructions to be handled, it requires a significant increase in the complexity of the issue stage circuitry 100, since for a complex instruction the issue stage circuitry 100 needs to separately identify the constituent operations required, and the source and destination registers applicable to each such operation, and needs to schedule those constituent operations one after the other in order to the appropriate pipelines, requiring the issue circuitry 100 to make multiple references to the scoreboard circuitry 140.

Accordingly, it would be desirable to provide a technique for handling the execution of complex instructions which avoids the increased pipeline depth issues of prior art such as that illustrated schematically in FIG. 1, whilst avoiding the complexity in the issue stage circuitry that can arise when adopting the prior art approach discussed above with reference to FIG. 2.

SUMMARY OF THE INVENTION

Viewed from a first aspect, the present invention provides a data processing apparatus for executing instructions defining operations to be performed by the data processing apparatus, the instructions including at least one complex instruction defining a sequence of operations to be performed, and the data processing apparatus comprising: a plurality of execution pipelines, each execution pipeline having a plurality of pipeline stages and arranged to perform at least one associated operation; issue circuitry for interfacing with the plurality of execution pipelines and scheduling performance of the operations defined by said instructions; for said at least one complex instruction, the issue circuitry being arranged to schedule a first operation in said sequence and to issue control signals to one of the execution pipelines with which that first operation is associated, the control signals including an indication of each additional operation in the sequence; when performance of the first operation reaches a predetermined pipeline stage in said one of the execution pipelines, that predetermined pipeline stage being arranged to schedule a next operation in the sequence and to issue additional control signals to a further one of said execution pipelines with which that next operation is associated in order to cause that next operation to be performed.

In accordance with the present invention, the issue circuitry is arranged to schedule only the first operation in the sequence of operations defined by a complex instruction, and then to issue control signals to the relevant execution pipeline for handling that first operation, those control signals including an indication of each additional operation in the sequence. Then, when performance of the first operation reaches a predetermined pipeline stage in that execution pipeline, that predetermined pipeline stage is arranged to schedule a next operation in the sequence. Once the predetermined pipeline stage has scheduled the next operation in the sequence, and hence determined that the next operation can proceed, it will issue additional control signals to the relevant execution pipeline for that next operation so as to cause that next operation to be performed.

This process can be repeated iteratively, so that complex instructions involving more than two operations can be routed through the required execution pipelines, for each operation other than the final operation the predetermined pipeline stage in the execution pipeline handling that operation being responsible for scheduling the next operation in the sequence and issuing the appropriate control signals to the execution pipeline that is to handle that next operation, those control signals identifying the remaining operation(s).

In accordance with the present invention, the issue circuitry does not need to keep a record of all of the remaining operations after the first operation, and merely needs to perform a single scheduling operation to schedule the first operation to the appropriate execution pipeline, whereafter the issue circuitry is no longer responsible for the further handling of the complex instruction. Instead, the control signals output by the issue circuitry include an indication of each additional operation in the sequence, and the task for managing the scheduling of these additional operations is then delegated to the predetermined pipeline stage in the relevant execution pipeline(s).

By such an approach, the pipeline depth of each individual execution pipeline can be kept relatively small, whilst also avoiding additional complexity in the issue stage circuitry that would otherwise be required if the issue stage circuitry 100 needed to maintain a record of each of the operations in the sequence defined by the complex instruction, and was required to perform multiple scheduling tasks in order to schedule each of those operations.

In one embodiment, the data processing apparatus further comprises: a register bank comprising a plurality of registers accessible to said plurality of execution pipelines when performing said operations, each register being specifiable by an operation as a source register for storing an input value for that operation or a destination register for storing a result value produced by that operation; and scoreboard circuitry for maintaining a record of registers used by operations being performed in said plurality of execution pipelines; when scheduling an operation, the issue circuitry initiating one or more checks to determine whether that operation can currently be performed, including referencing the scoreboard circuitry to check that the operation can proceed having regard to the registers to be accessed; when scheduling the first operation of said at least one complex instruction, the issue circuitry referencing the scoreboard circuitry taking into account all registers specified by the sequence of operations defined by that complex instruction.

Hence, whilst the issue circuitry only needs to schedule the first operation, it will reference the scoreboard circuitry taking into account all registers specified by the sequence of operations defined by that complex instruction. This can be used to avoid the issue circuitry dispatching the first operation to the relevant pipeline in situations where the handling of the complex instruction would then become stalled due to the inability to continue with performance of one or more of the subsequent operations in the sequence defined by the complex instruction.

There are a number of ways in which the issue circuitry may take into account all of the registers specified by the sequence of operations defined by the complex instruction when referencing the scoreboard circuitry. In one embodiment, for each register in the register bank the scoreboard circuitry maintains a locked field which is set to identify that the register has been locked for use by one of the operations, and for said at least one complex instruction the issue circuitry is arranged when scheduling the first operation to issue a lock request to the scoreboard circuitry to lock any registers specified by the sequence of operations other than the source registers for the first operation in the sequence, the registers specified by the lock request being locked provided that the first operation can currently be performed and the specified registers are available to be locked, and the issue circuitry only issuing the control signals to said one of the execution pipelines with which the first operation is associated once all registers specified by the lock request have been locked.

Hence, in this embodiment, the issue circuitry seeks to lock all of the registers required for the sequence of operations other than the source registers for the first operation. To do this, a determination must be made that the first operation can currently be performed, and as discussed earlier this may involve performing checks such as determining that the execution pipeline to which the first operation is to be dispatched is ready to receive that operation. It will also typically involve determining that all of the destination registers specified by the various operations are free, i.e. not locked, and that all source registers are free or their contents are at least available via an appropriate forwarding path. Once it has been determined that the first operation can be performed, then the register specified in the lock request are locked. By locking the destination registers, this avoids the possibility of more than one execution pipeline seeking to modify the same register at the same time. By locking all of the source registers that are not used for the first operation, this avoids them being modified by any subsequent operation associated with a different instruction before they are read by the relevant remaining operation(s) of the complex instruction.

In one such embodiment, when scheduling the next operation, the predetermined pipeline stage initiates one or more checks to determine whether that next operation can currently be performed, and if the next operation can currently be performed the predetermined pipeline stage is arranged to unlock any source registers that are to be used by the next operation.

Since in this embodiment the source and destination registers required by the next operation will already have been locked prior to the first operation being issued from the issue circuitry, there will not be any interlock issues at this point preventing the next operation from being performed. However, there may still be other issues that will cause the next operation to be temporarily stalled, for example the execution pipeline that is to perform that next operation may currently be unable to receive the next operation.

As an alternative to the above described approach employed by the issue circuitry to take into account all registers specified by the sequence of operations defined by the complex instruction, an alternative approach may be taken as described below. In particular, in one embodiment, for each register in the register bank the scoreboard circuitry maintains a locked field which is set to identify that the register has been locked for use by one of the operations, and a reserved field which is set to identify that the register has been reserved for use by one of the operations, the reserved field being settable even if the locked field for the same register is currently set. For said at least one complex instruction the issue circuitry is arranged when scheduling the first operation to issue a reserve request to the scoreboard circuitry to reserve any registers specified by the sequence of operations other than the source registers for the first operation in the sequence, the registers specified by the reserve request being reserved provided that the first operation can currently be performed, and the specified registers are available to be reserved, the issue circuitry issuing the control signals to said one of the execution pipelines with which the first operation is associated once all registers specified by the reserve request have been reserved, even if one or more of those registers is currently locked.

By using such a reservation mechanism, this allows a significant reduction in the number of cycles taken to execute the complex instruction. In particular, since the reserved field is settable even if the locked field for the same register is currently set, this will allow in some situations for the first operation to be dispatched to the relevant execution pipeline earlier than would otherwise be the case if the issue circuitry had to wait until all relevant registers could be locked. For example, by the time a subsequent operation is being scheduled by the predetermined pipeline stage, a register that had been locked at the time the issue stage circuitry dispatched the first operation may no longer be locked, and since it has been reserved it will not be able to be locked by any subsequent instruction that the issue circuitry is seeking to schedule. Accordingly, at this point, the predetermined pipeline stage can proceed to schedule the next operation without further delay, assuming no other checks indicate a reason for the next operation to be stalled. Indeed, even if some delay is incurred at the predetermined pipeline stage before the next operation can be scheduled, this may still give rise to a reduced number of execution cycles for executing the complex instruction, since the first operation may have been dispatched earlier than would have been the case if the issue circuitry had had to wait to lock certain registers before dispatching the first operation.

In one embodiment, if a destination register is specified for said first operation, the issue circuitry is arranged to issue a lock request for that destination register rather than a reserve request. This ensures that the destination register is then available to receive the result of the first operation when that result is calculated.

In one embodiment, when scheduling the next operation, the predetermined pipeline stage initiates one or more checks to determine whether that next operation can currently be performed, and if the next operation can currently be performed the predetermined pipeline stage is arranged to unreserve any source registers which are to be used by the next operation, and to issue a lock request to the scoreboard circuitry for at least any destination register specified for said next operation, the scoreboard circuitry being arranged in response to the lock request, provided that the associated lock field has not already been set by an earlier operation, to set the associated locked field and to clear the associated reserved field for each register specified by the lock request, the predetermined pipeline stage only issuing the additional control signals to said further one of said execution pipelines once all registers specified by the lock request have been locked.

For the next operation to be able to be performed, then clearly none of the source or destination registers used by that next operation must still be locked by some other operation executing in one of the pipelines. Also, the execution pipeline that is to perform that next operation must be available to receive that next operation. Assuming these, and any other applicable criteria, are met, then the source registers for the next operation can merely be unreserved, and their contents read, and at the same time any destination register for the next operation can be locked, at which point the reserved field for that register can be cleared.

Whilst some complex instructions may specify a sequence of two operations, other complex instructions may specify sequences of more than two operations. In one embodiment, if said at least one complex instruction defines a sequence of more than two operations, then when performance of each operation in the sequence reaches a predetermined pipeline stage in the execution pipeline performing that operation, that predetermined pipeline stage is arranged to schedule a following operation in the sequence and to issue additional control signals to the execution pipeline with which that following operation is associated in order to cause that following operation to be performed. Hence, the technique of embodiments of the present invention can be adapted to deal with complex instructions defining an arbitrary number of operations by ensuring that the control signals issued to any particular execution pipeline include an indication of all remaining operations in the sequence of operations defined by the complex instruction, so that those remaining operations can subsequently be scheduled.

It will be appreciated that in accordance with embodiments of the present invention, scheduling is performed by more than one entity. In particular, not only does the issue circuitry perform some scheduling, but also the predetermined pipeline stage in at least one execution pipeline can also perform scheduling activities. In one embodiment, the apparatus further comprises scheduling arbitration circuitry for arbitrating between the scheduling activities of the issue circuitry and the predetermined pipeline stage. In one embodiment, if both the issue circuitry and the predetermined pipeline stage are seeking to schedule operations to the same execution pipeline at the same time, the scheduling arbitration circuitry gives priority to the operation being scheduled by the predetermined pipeline stage. Hence, this ensures that priority is given to operations forming part of a complex instruction that is already in the process of being executed, rather than to any operations for later instructions being scheduled by the issue circuitry.

In one embodiment multiple of said plurality of execution pipeline stages each include a predetermined pipeline stage for performing scheduling of operations defined by complex instructions, and if multiple predetermined pipeline stages are seeking to schedule operations of different complex instructions to the same execution pipeline at the same time, the scheduling arbitration circuitry gives priority to the operation of the complex instruction whose first operation was first scheduled by the issue circuitry. Hence, by such an approach, priority is given to the oldest complex instruction, i.e. the one first processed through the issue circuitry.

The arbitration circuitry can be provided at a variety of locations within the data processing apparatus. However, in one embodiment, the scheduling arbitration circuitry is provided within scoreboard circuitry used to maintain a record of registers used by operations being performed in said plurality of execution pipelines.

In one embodiment, one pipeline stage in said one of the execution pipelines is merged with one pipeline stage in said further one of said execution pipelines, thereby reducing execution time of the at least one complex instruction. In one particular embodiment, said one pipeline stage in said one of the execution pipelines is a write back pipeline stage used to output the result of the first operation. The one pipeline stage in said further one of said execution pipelines may be any appropriate pipeline stage having regard to the operation that needs to be performed by that execution pipeline, but typically is an early pipeline stage such as a first execute pipeline stage used to begin execution of the next operation.

Quite often, the execution pipelines operate on data in an internal format, so that when reading an operand from a source register, that operand data is translated into the internal format, and then before writing the result back to the register bank it is translated back to the external format from the internal format. When merging the write back pipeline stage used to output the result of the first operation with the first execute pipeline stage used to begin execution of the next operation, such translation steps can be avoided thereby enabling the required operations to still be performed within a single cycle. In particular, the result of the first operation is typically used as a source operand for the next operation, and such an approach avoids translating the result back to the external format and then re-translating it again to the internal format prior to it being executed upon as a source operand for the next operation.

The predetermined pipeline stage used to perform the scheduling of the next operation of the complex instruction may be any appropriate pipeline stage of the execution pipeline. In one embodiment it will be provided by the write back pipeline stage of the execution pipeline. However, in embodiments where the write back pipeline stage of a first execution pipeline is merged with a pipeline stage in a second execution pipeline, the predetermined pipeline stage in that first execution pipeline may be provided by a pipeline stage prior to the write back pipeline stage.

Viewed from a second aspect, the present invention provides a method of executing within a data processing apparatus instructions that include at least one complex instruction, each complex instruction defining a sequence of operations to be performed, the data processing apparatus having a plurality of execution pipelines, each execution pipeline having a plurality of pipeline stages and arranged to perform at least one associated operation, the method comprising the steps of: employing issue circuitry to interface with the plurality of execution pipelines and to schedule performance of the operations defined by said instructions; for said at least one complex instruction, causing the issue circuitry to schedule a first operation in said sequence and to issue control signals to one of the execution pipelines with which that first operation is associated, the control signals including an indication of each additional operation in the sequence; when performance of the first operation reaches a predetermined pipeline stage in said one of the execution pipelines, causing that predetermined pipeline stage to schedule a next operation in the sequence and to issue additional control signals to a further one of said execution pipelines with which that next operation is associated in order to cause that next operation to be performed.

BRIEF DESCRIPTION OF THE DRAWINGS

The present invention will be described further, by way of example only, with reference to embodiments thereof as illustrated in the accompanying drawings, in which:

FIGS. 11A and 11B schematically illustrate the improvement in execution speed that can be achieved through use of the reservation mechanism of FIG. 5;

DESCRIPTION OF EMBODIMENTS

Figure 3:
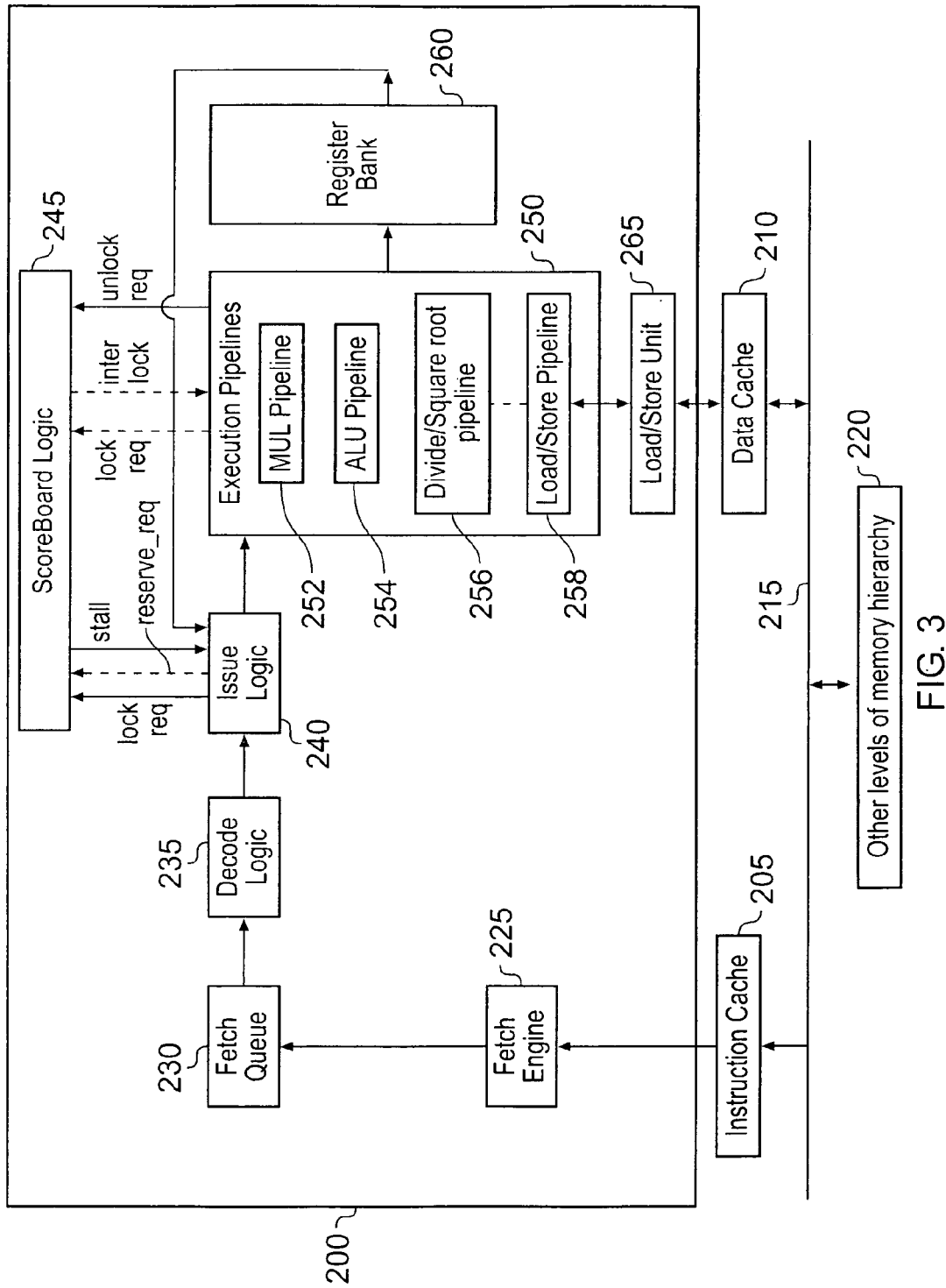
FIG. 3 is a block diagram of a data processing apparatus in which techniques of embodiments of the present invention may be employed.

FIG. 3 is a block diagram of a data processing apparatus in accordance with one embodiment of the present invention. In accordance with the illustrated embodiment, a processor 200 may be provided with a fetch engine 225 for fetching instructions from memory for execution by the processor. The fetch engine 225 may interface with an instruction cache 205, which in turn is coupled with other levels of memory hierarchy 220 via a bus infrastructure 215. The other levels of memory hierarchy 220 may include one or more further levels of caching. As each instruction is fetched, it is placed in a fetch queue 230 from where it is then dispatched to decode logic 235. The decode logic decodes each instruction to produce operation control information specifying the required operation to be performed in response to that instruction, with that operation control information then being routed to the issue logic 240, which itself may incorporate a queue.

The issue logic 240 is responsible for scheduling performance of each of the operations representing each instruction. To do this, it needs to determine which of the execution pipelines 250 any particular operation should be routed to and then determine whether there are any conditions which would prevent that operation being dispatched to that execution pipeline at the current time. This for example may be the case if the particular identified execution pipeline is not ready to receive a new operation. This may also be the case if that operation needs to access registers in the register bank 260 that are currently being used by operations already in progress within one of the execution pipelines 250. In particular, each operation will typically identify one or more source registers containing source operands for that operation, and also will typically identify a destination register into which the result of the operation is to be placed. Prior to dispatching an operation to an execution pipeline, the issue logic 240 will typically reference the scoreboard logic 245 which keeps a record of the current usage of the registers by the operations within the execution pipeline, in order to check that the required registers are available. If they are available, then the issue logic 240 may issue a lock request to the scoreboard logic to lock one or more of those registers prior to dispatching the operation to the relevant execution pipeline, so that the contents of those locked registers will not be modified or read whilst the operation is in progress. It is however not typically necessary to lock all of the registers, since if the contents of the relevant source registers can be read by the issue logic 240 from the register bank 260 at the time of dispatching the operation to the relevant execution pipeline 250, then those source registers will not need to be referenced again, and accordingly do not need to be locked. Hence, for an instruction specifying a single operation, for example an add instruction identifying an add operation, the issue logic 240 will typically only seek to lock the destination register.

Figure 1:
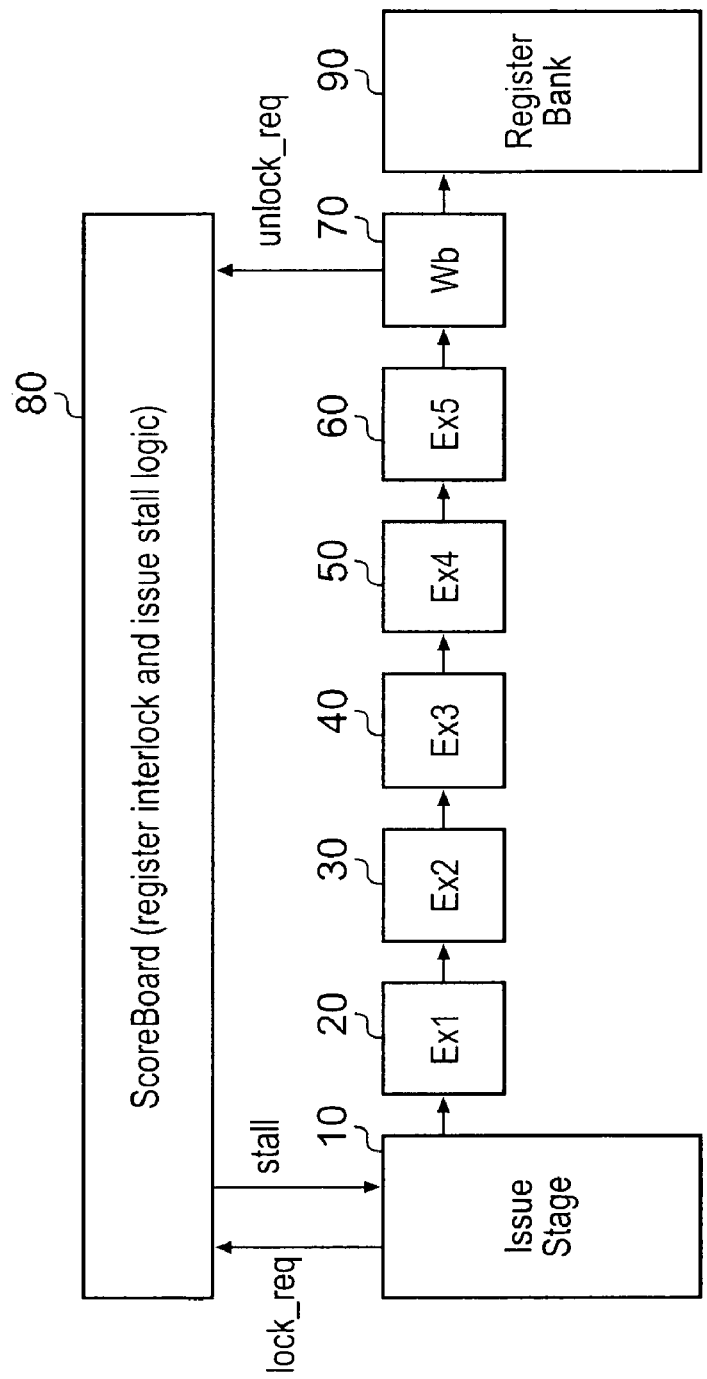
FIG. 1 is a diagram schematically illustrating a first prior art scheme for handling complex instructions.
Figure 2:
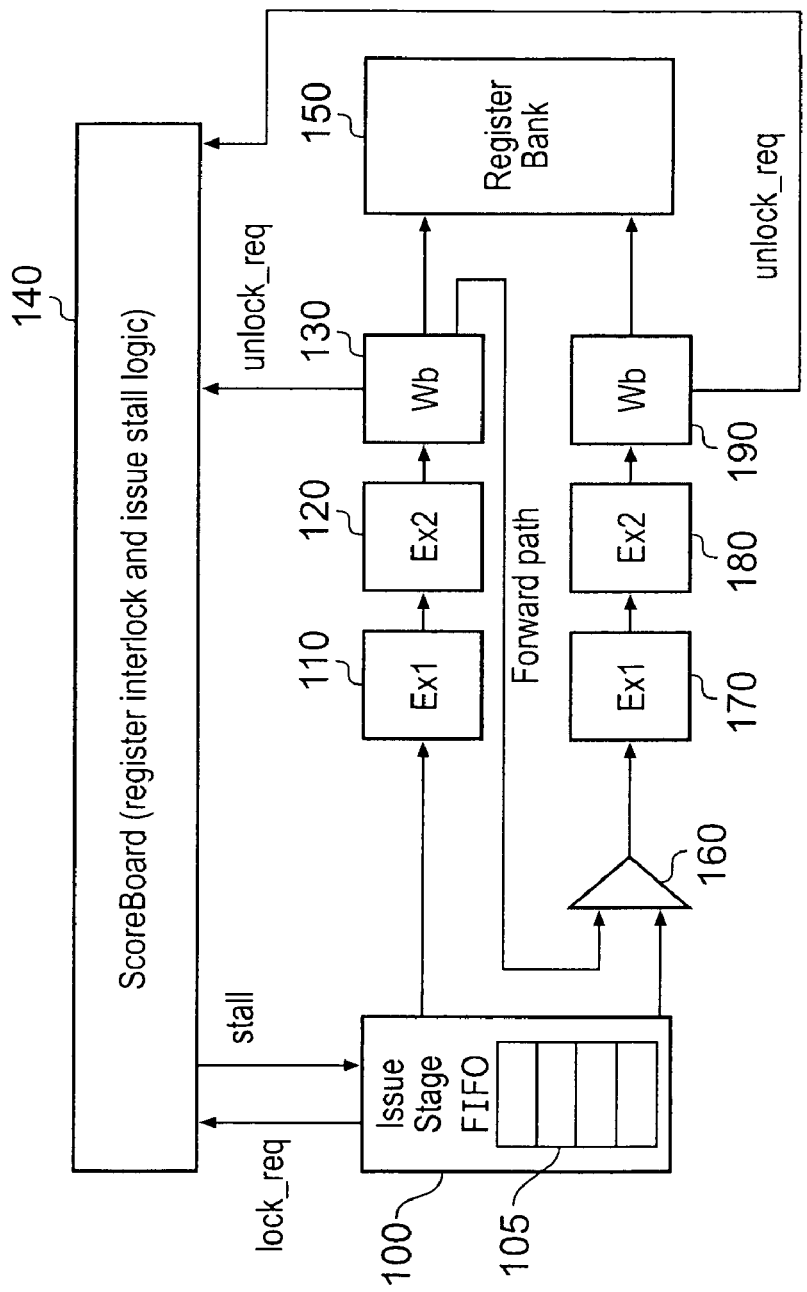
FIG. 2 is a diagram schematically illustrating a second prior art scheme for handling complex instructions.

It will be appreciated from the above discussion that there are a number of checks that need to be performed when scheduling an instruction. The check performed with reference to the record of register usage maintained within the scoreboard logic 245 is often referred to as a register interlock check, and if there is a register interlock for a particular operation that the issue logic is attempting to schedule, due to one or more of the registers that that operation wishes to access already being locked by an earlier operation, then this will be one reason for the scoreboard logic 245 to issue a stall signal to the issue logic. However, as will be appreciated by those skilled in the art, this is not the only reason that a stall may need to be raised. For example, as discussed earlier, the particular execution pipeline to which an operation needs to be dispatched may not be ready to receive such a new operation. In the embodiment illustrated in FIG. 1, all of the various checks are performed within the scoreboard logic 245.

Hence, considering a simple instruction specifying a single operation, the issue circuitry will send the necessary details about that operation to the scoreboard logic 245 in order for an assessment to be made as to whether a stall condition exist, and if so a stall signal will be issued to the issue logic 240 from the scoreboard logic 245. The issue logic 240 will also typically send a lock request to the scoreboard logic seeking to lock the destination register for the operation. Assuming that a stall condition is not detected, then the lock request will be accepted, the issue logic 240 will typically read from the register bank 260 the relevant source operands, and then the required control signals defining that operation will be routed to the relevant execution pipeline.

Accordingly, for a multiply instruction control signals will be sent to the multiply pipeline 252 to cause the required multiply operation to be performed, for an add operation control signals will be sent to the ALU pipeline 254 to cause an add operation to be performed, for a divide or square root instruction control signals will be sent to the divide/square root pipeline 256 to cause the required operation to be performed, for a load or a store instruction control signals will be sent to the load/store pipeline 258 to cause a load or store operation to be performed, etc. Considering the load/store operation, the load/store pipeline 258 will typically communicate with a load/store unit 265 responsible for loading data from memory into the register bank 260, or for storing data from the register bank 260 back to memory. In a similar way to the fetch engine 225 discussed earlier, the load/store unit 265 will typically interface with a data cache 210, which will then be coupled with the other levels of the memory hierarchy 220 via a bus infrastructure 215.

In accordance with embodiments of the present invention, a new technique is proposed for handling complex instructions, such instructions defining a sequence of operations to be performed rather than just a single operation. An example of such a complex instruction is a multiply-accumulate instruction, which defines a multiply operation followed by an accumulate operation, the result of the multiplication being used as one of the operands for the accumulate operation. In accordance with embodiments of the present invention, no dedicated multiply-accumulate pipeline is provided, and instead the separate multiply pipeline 252 and ALU pipeline 254 must be used. However, to avoid the issue logic 240 having to schedule each component operation independently, and keep a record of the accumulate operation internally whilst the multiply operation is being performed, in accordance with embodiments of the present invention the issue logic only needs to schedule the first operation of the complex instruction, in this example the multiply operation, and each subsequent operation of the complex instruction is then scheduled at a final pipeline stage of the relevant pipeline.

Hence, considering the multiply-accumulate instruction example, the issue logic 240 will schedule the multiply operation to the multiply pipeline 252, and then in a write back stage of the multiply pipeline 252, that write back stage will then schedule the accumulate operation to the ALU pipeline 254. Details of how this is achieved in accordance with various embodiments of the present invention will be provided later. However, at a general level the issue logic 240 references the scoreboard logic 245 taking into account all of the source and destination registers used by the various operations defined by the complex instruction, but only seeks to actually schedule the first operation.

In one embodiment, the issue circuitry 240 issues a lock request to seek to lock all of the registers other than the registers used as the source operand for the first operation; as discussed earlier there is no need for the source registers of the first operation to be locked, since they will be read at the time of issuing the relevant control signals to the appropriate execution pipeline. Assuming it is determined that the first operation can proceed, i.e. does not need to be stalled, then the specified registers will be locked and control signals will be sent to the appropriate pipeline for handling the first operation, those control signals including an indication of each additional operation in the sequence. Hence, considering the multiply-accumulate instruction example, a multiply operation will be scheduled by the issue logic 240 and dispatched to the multiply pipeline 252, the control signals provided to the multiply pipeline identifying that there is an additional operation to be performed, in particular an add operation, those control signals also identifying the source and destination registers applicable to that add operation. From this point on, the issue logic 240 has no further part to play in the scheduling of the remainder of the operations of the complex instruction.

When the write back stage of the multiply pipeline 252 is reached, the write back stage again references the scoreboard logic 245 to seek to schedule the add operation to the ALU pipeline 254. Since all of the source and destination registers for the add operation will already have been locked due to the earlier action of the issue logic 240, there will not be any interlock issues at this point, but there may be other reasons why the add operation cannot be immediately dispatched, for example because the ALU pipeline 254 is not ready. However, assuming that it is determined that the add operation can proceed, then the multiply pipeline sends an unlock request to the scoreboard logic 245 to unlock the source registers for the second operation, whereafter appropriate control signals are forwarded to the ALU pipeline 254 to cause the add operation to be performed. When the add operation reaches the end of the add pipeline, a further unlock request is sent to the scoreboard logic to unlock the destination register specified for the add operation.

Clearly, this approach can be scaled to cover complex instructions that include more than two operations. By way of example, if the complex instruction specified a multiply operation, followed by an add operation, followed by one further operation, then the above sequence of steps will be performed, but in the write back stage of the ALU pipeline 254, the write back stage would seek to schedule the further operation into the appropriate pipeline in the same way that the write back stage of the multiply pipeline 252 scheduled the add operation to the ALU pipeline 254.

In an alternative embodiment of the present invention, a reservation mechanism is used by the issue logic 240, which avoids the need to lock all of the registers required by the operations constituting the complex instruction prior to being able to dispatch the first operation from the issue logic. In particular, in this embodiment, if there is a destination register specified for the first operation, that destination register will still typically be locked. However, all of the other registers that would otherwise have been locked are instead made the subject of a reservation request of the scoreboard logic 245, the scoreboard logic including an additional entry for each register which can be set to mark that register as reserved. A register can be marked as reserved even if it is already locked. The effect of marking a register as reserved is that when the lock is subsequently released by the operation that had set the lock, no other operation is allowed to lock that register again other than the operation that caused the reserve field to be set. This can provide significant performance improvements, since it enables the first operation of a complex instruction to be dispatched from the issue logic more quickly than might otherwise be the case. At the write back stage of the pipeline where the next operation needs to be scheduled, it is now possible that an interlock may occur. For example, a second operation may need to access register one as a source operand, and at the time the first operation was dispatched by the issue logic register one may have been marked as reserved, but may have already been locked by some other operation. It is possible that at the write back stage that register is still locked, and accordingly cannot be accessed by the second operation, as a result of which an interlock condition will arise. However, once the interlock condition has disappeared, and assuming there are no other conditions preventing the second operation starting, then the write back stage will typically issue a lock request to the scoreboard logic 245 to lock and unreserve the destination register of the second operation, and in addition will unreserve the source registers for the second operation, since at the time the control signals are issued to the appropriate pipeline for performing the second operation, the required source operands will be read from the register bank 260, or will be made available over an appropriate forwarding path. Typically, at this point the write back stage in the pipeline that handled the first operation will also unlock the destination register for the first operation, if any was specified.

Figure 4:
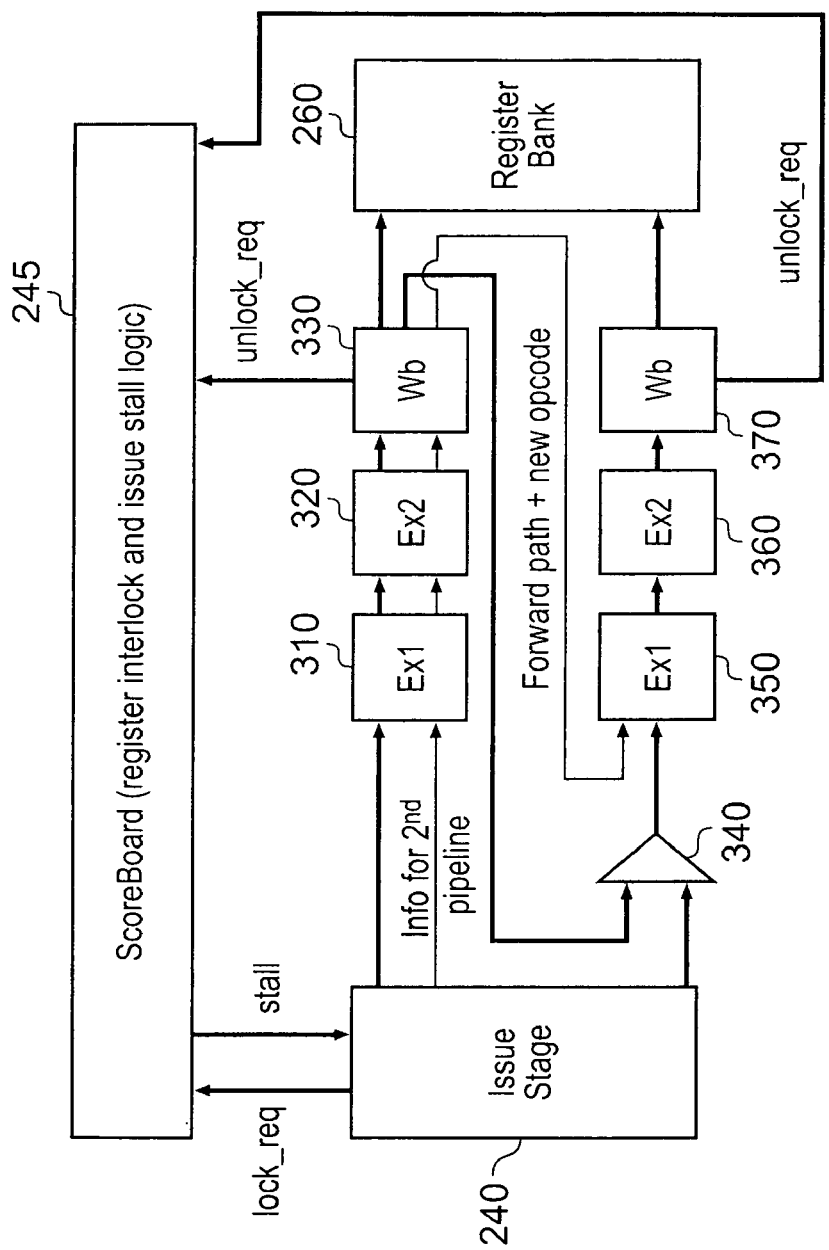
FIG. 4 is a diagram schematically illustrating the handling of complex instructions in accordance with one embodiment of the present invention.

FIG. 4 schematically illustrates the handling of complex instructions in accordance with the first embodiment described above. In particular, in this example, it is assumed that each pipeline consists of three pipeline stages, and accordingly a first pipeline has pipeline stages 310, 320, 330 and a second pipeline has pipeline stages 350, 360, 370. In this example, for a complex instruction, the issue stage circuitry 240 references the scoreboard circuitry 245 having regards to all of the source and destination registers used by the various operations of the complex instruction, and assuming no stall condition is raised having regards to the register interlock check and any other relevant checks, it will then cause all of the registers other than the source registers for the first operation to be locked, and will then issue control signals to the first pipeline, it being assumed that the first pipeline is the appropriate pipeline for handling the first operation of the complex instruction. In addition to the usual control information routed into that pipeline to enable it to perform the first operation, the control signals also include the required information for enabling the second pipeline to later perform the second operation of the complex instruction. In this example, it is assumed that the complex instruction defines two operations, but if it defined more than two operations, that additional information would also have to identify the appropriate information for all of the remaining operations.

When the write back stage 330 of the first pipeline is reached, then if a destination register is specified for the first operation, the result can be written back to the register bank 260, and the destination register can be unlocked. However, it is often the case that the destination of the first operation of a complex instruction does not need to be written back to the register bank, and instead it is used directly as an operand for the second operation.

The write back stage 330 when completing the first operation seeks to schedule the second operation into the second pipeline, and hence again references the scoreboard logic 245. As mentioned earlier, since all of the relevant registers have already previously been locked, there will not be any interlock issues at this point, but there could be one or more other conditions that cause a stall at this point. However, assuming there is no reason to stall this second operation, then the write back stage 330 forwards the relevant control signals to the first execute stage 350 of the second pipeline. The result of the first operation is also typically forwarded via a forwarding path and multiplexer 340 into that first execute stage 350. It will be appreciated that the multiplexer 340 is provided since the issue stage 240 may quite legitimately have reasons for issuing operations directly to that second pipeline, those operations relating to other instructions scheduled after the complex instruction. In one embodiment, the responsibility for arbitrating between both the write back stage 330 and the issue stage 240 seeking to schedule an operation to the second pipeline at the same time is taken by the scoreboard logic 245, which in that event is arranged to issue a stall signal to the issue stage 240 so as to give preference to the second operation of the complex instruction seeking to be scheduled by the write back stage 330.

When the second operation reaches the write back stage 370 of the second pipeline, then typically the result will be written to the specified destination register in the register bank 260 and an unlock request will be issued to the scoreboard circuitry 245 to cause the destination register to be unlocked.

Figure 5:
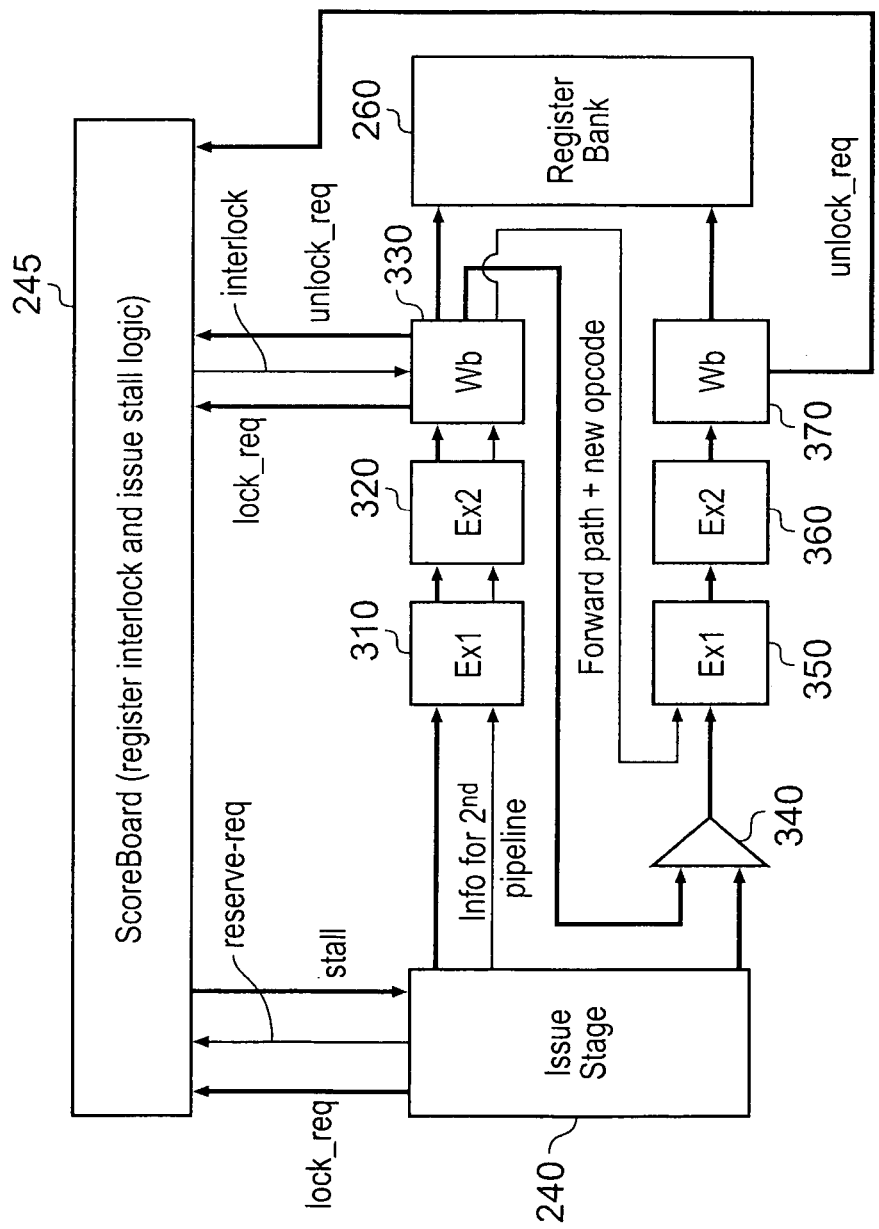
FIG. 5 is a diagram schematically illustrating the handling of complex instructions in accordance with an alternative embodiment of the present invention.

FIG. 5 is a similar diagram to FIG. 4, but illustrates operation in accordance with the second embodiment described earlier, where the issue stage circuitry is able to reserve rather than lock registers. The basic operation is the same as in FIG. 4, but when referencing the scoreboard circuitry 245 with the aim of scheduling the first operation of a complex instruction, the issue circuitry will attempt to only lock any destination register(s) specified for the first operation, and will seek to reserve all other registers other than the source registers for the first operation. When the write back stage 330 is reached, and the write back stage is hence seeking to schedule the second operation into the second pipeline, it is possible that an interlock will occur if the registers that had been reserved for the second operation are still not available for use. However, assuming they are available for use, then a lock request is issued from the write back stage 330 to seek to lock and unreserve the destination register for the second operation, and at the same time the source registers for the second operation are unreserved since the contents of those source registers will now be read via the read ports of the register bank 260 and passed to the second pipeline.

As before, the write back stage 330 will also typically unlock any specified destination register for the first operation. Further, as with FIG. 4, when the second operation reaches the write back stage 370, the destination register for the second operation will be unlocked.

As with the embodiment described in FIG. 4, the embodiment described in FIG. 5 can be scaled to cover execution of complex instructions consisting of more than two operations by merely enabling the write back stage in each pipeline to perform the operation described with reference to the write back stage 330 of the first pipeline, and by ensuring that whenever the control signals are routed from one pipeline to the next, they include the appropriate information for all remaining operations of the complex instruction.

Figure 6:
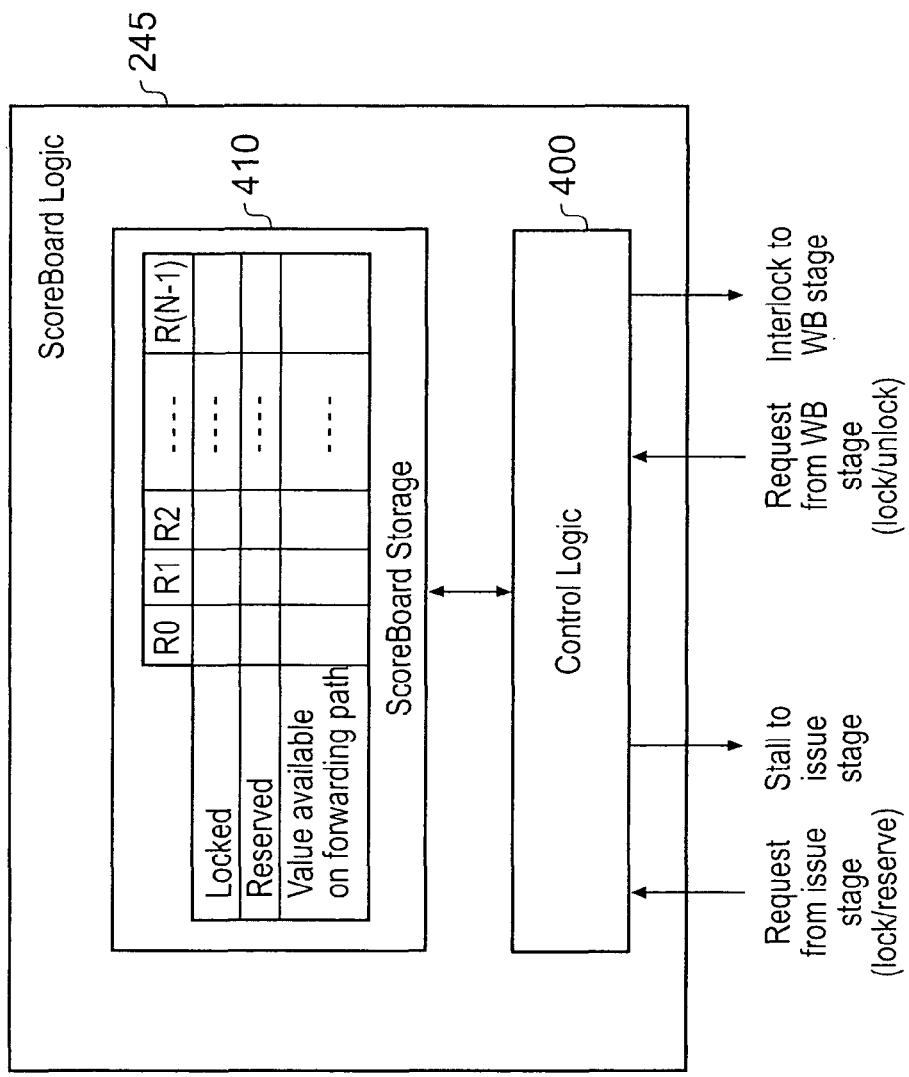
FIG. 6 is a diagram illustrating in more detail the scoreboard logic of FIG. 5 in accordance with one embodiment of the present invention.

FIG. 6 is a diagram illustrating in more detail the scoreboard circuitry 245 of FIG. 5. As shown, control logic 400 is provided for interfacing with the issue stage 240 and with the write back stage 330 (and indeed any other write back stages that may need to schedule further operations of a complex instruction). The control logic 400 interfaces with a scoreboard storage 410 which for each of the registers in the register bank 260 maintains a number of fields. A first field identifies whether that register is locked, a second field identifies whether the register is reserved, and a third field identifies whether the value in that register is available on a forwarding path. When assessing whether an interlock condition exists (as mentioned earlier this being one of a number possible conditions that may require a stall to occur), then when adopting the embodiment of FIG. 4, the control logic 400 needs to determine that all of the destination registers are free, i.e. not locked, and all of the source registers are either free or marked as having their value available on a forwarding path. When adopting the approach of FIG. 5, then in response to the request from the issue stage, the control logic needs to check that any destination register(s) defined for the first operation are free, that any source registers that are going to be used by the first operation are free or have their value available on the forwarding path, and that all other registers are not already reserved.

When using the embodiment of FIG. 4, then at the write back stage no further request to lock registers will be received, and only requests to unlock registers will be received. Further, no interlock conditions should arise as all of the required registers have previously been locked in response to a request from the issue stage. However, when employing the technique of FIG. 5, the control logic 400 may also receive lock requests from the write back stage, and may also need to signal interlocks to the write back stage.

Figure 7A:
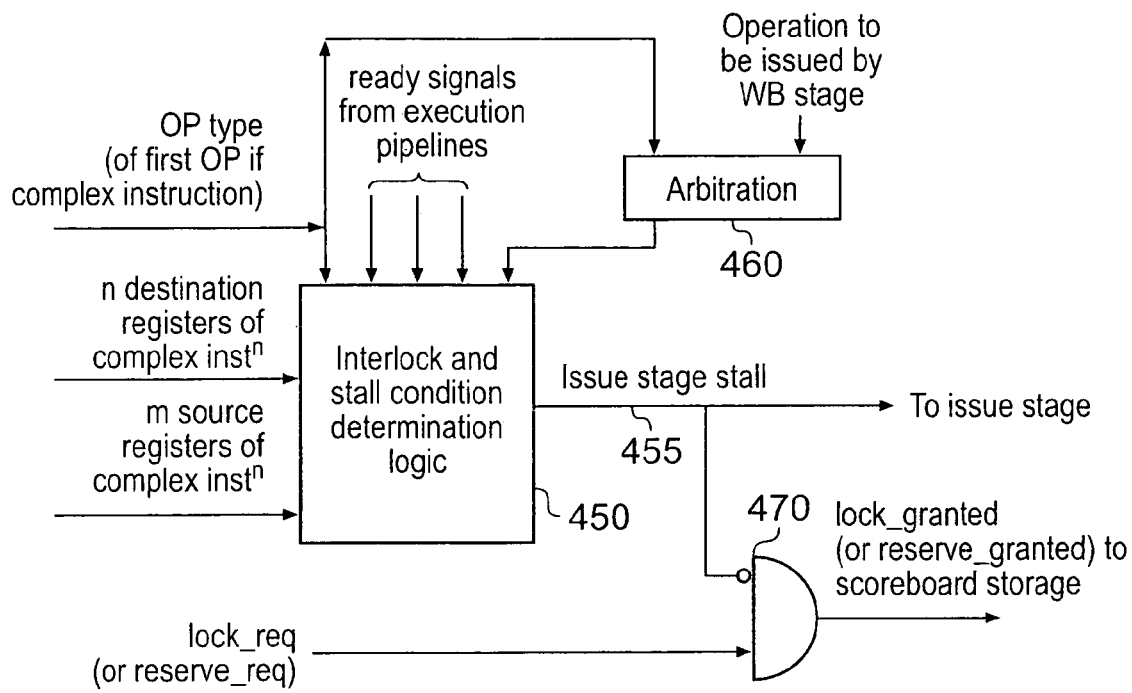
FIGS. 7A and 7B illustrate in more detail the operation of the control logic of FIG. 6 when interfacing with the issue circuitry and write back pipeline stages, respectively.
Figure 7B:
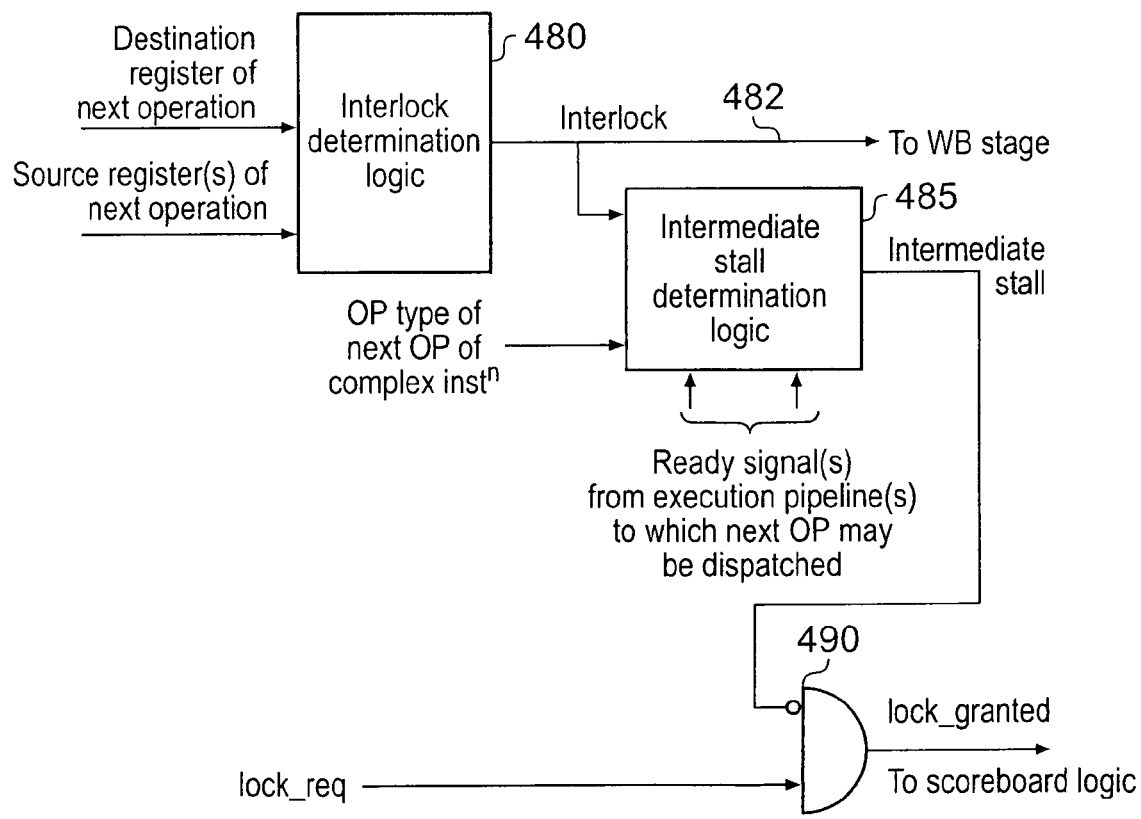

FIGS. 7A and 7B illustrate in more detail the operation of the control logic 400 responsive to requests from the issue stage 240 and the write back stage 330, respectively. Considering first FIG. 7A, interlock and stall condition determination logic 450 will receive the destination and source registers index from the issue circuitry identifying the source and destination registers used by the operation being scheduled. For a complex instruction, even though the issue stage is only going to schedule the first operation, that destination and source registers index will identify all of the m source and n destination registers used by all of the operations constituting the complex instruction, where m and n are integers of 0 or more.

The interlock and stall condition determination logic 450 also receives an operation type signal from the issue stage circuitry identifying the operation type of the operation to be scheduled, this identifying the operation type of the first operation in the event of a complex instruction. The interlock and stall condition determination logic 450 also receives ready signals from the various execution pipelines, and based on the ready signals and the op type signal can determine whether the pipeline that would be required to handle the operation is ready to receive the operation. Using the destination and source register indexes, the interlock and stall condition logic 450 can also reference the scoreboard storage 410 to check that there are no interlock issues that would require a stall to be generated.

Additionally, arbitration logic 460 within the control logic 400 receives the operation type signal and an indication of any operations seeking to be scheduled by a write back stage. For ease of illustration, it is assumed here that the complex instruction defines two operations as shown schematically in FIG. 5, and accordingly there is only one write back stage that may be seeking to schedule a further operation. As discussed earlier, in the event that both the issue stage circuitry and the write back stage are seeking to schedule an operation to the same pipeline, the arbitration logic 460 will give preference to the write back stage, and accordingly in those instances will output a signal to the interlock and stall condition determination logic 450 identifying that the request from the issue stage should be stalled.

If the interlock and stall condition determination logic 450 determines any conditions which require a stall to be issued, then a stall signal will be sent to the issue stage 240 over path 455. An inverted version of the issue signal is also forwarded to an AND gate 470, which receives at its other input the lock request or reserve request from the issue stage circuitry. Assuming the stall signal is not set, the AND gate 470 will output a logic 1 value to the scoreboard storage to identify that the lock request or reserve request is granted, and that the registers specified in that request should be locked/reserved.

Considering now FIG. 7B, when the write back stage 330 is reached, interlock determination logic 480 within the control logic will be accessed based on the destination and source register indexes applicable to the second operation. In some instances a source register may not need to be specified because, for example, it may be provided by the output of the first operation and/or may be the same as the destination register of the second operation. As discussed earlier, all of the source and destination registers applicable to the second operation will have been reserved by the issue stage circuitry, but it is possible that they may not yet be available to be locked, and if they are not available an interlock signal is issued to the write back stage over path 482. The interlock signal is also routed as one of the inputs to the intermediate stall determination logic 485 which receives the operation type of the next operation of the complex instruction, in this example the second operation, and also receives the ready signal from each execution pipeline to which that next operation may be dispatched. Considering the simple example where the second operation will always be dispatched to one particular execution pipeline, then it may only be necessary for a single ready signal to be received by the intermediate stall determination logic 485. For example, if the multiply-accumulate instruction is the only complex instruction being catered for, then it will always be the write back stage in the multiply pipeline that will be performing the scheduling, and it will always be the add pipeline that will be receiving the second operation.

Based on the indicated operation type and the ready signals received, the intermediate stall determination logic 485 will determine whether the second operation can yet be scheduled. The intermediate stall determination logic 485 will also take account of the interlock signal, in that if the interlock signal has been set, then an intermediate stall will be needed since this is one of the reasons this second operation may not yet be able to be performed.

An inverted version of the intermediate stall signal is then routed to the AND gate 490 to qualify any lock request issued by the write back stage, in that the lock request will only be granted if there is no reason to stall the second operation.

Figure 8:
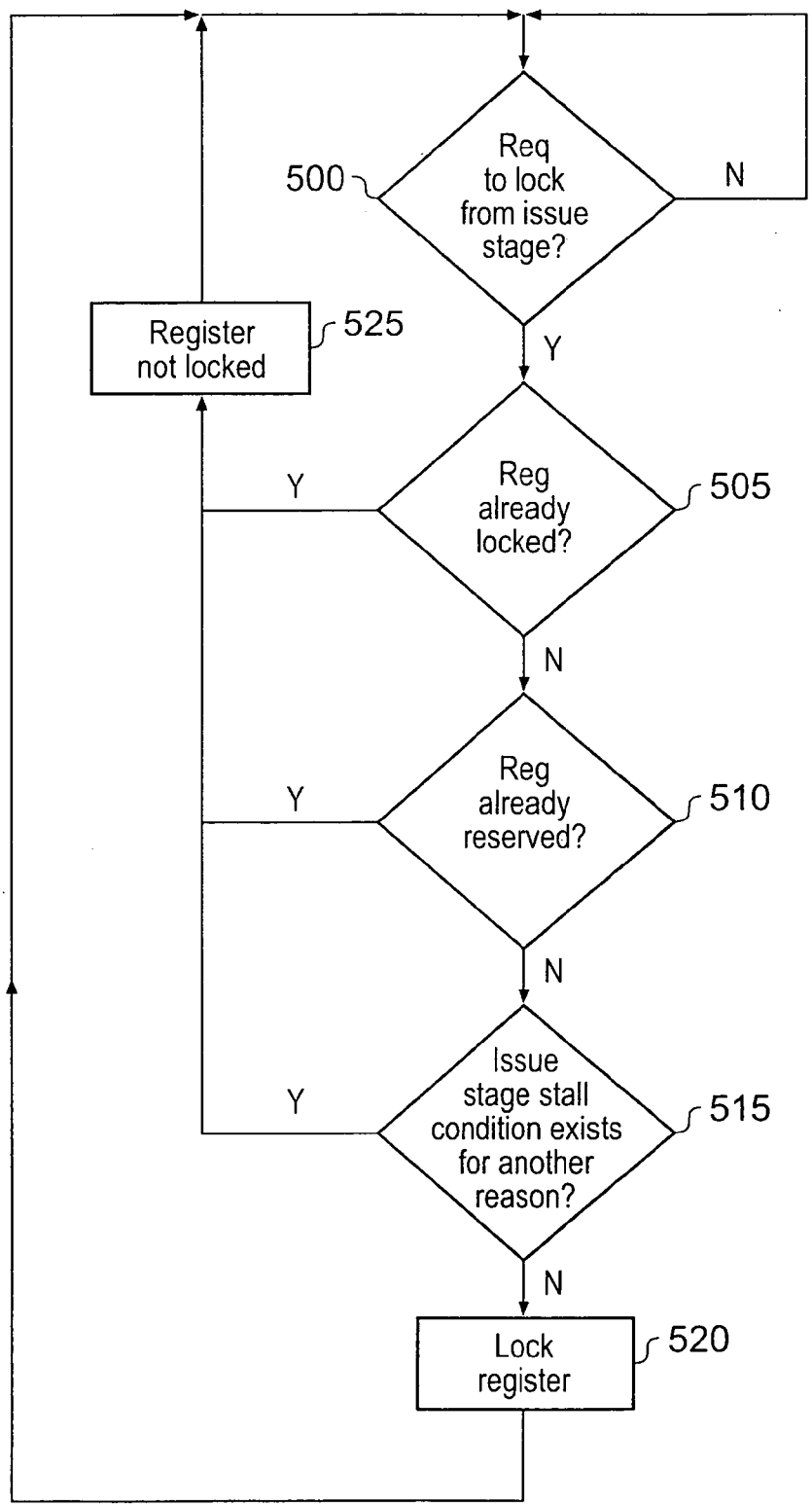
FIG. 8 is a flow diagram illustrating the steps performed by the control logic of FIG. 6 upon receipt of a lock request from the issue stage circuitry in accordance with one embodiment of the present invention.

FIG. 8 is a flow diagram illustrating the steps performed by the control logic 400 in response to a lock request from the issue stage circuitry 240. At step 500 it is determined whether such a lock request has been received, and if so it is determined at step 505 with reference to the scoreboard storage whether the specified register has already been locked. If so, then the process proceeds to step 525, where the register is not locked. If the register is not already locked, then it is determined at step 510 whether the register is already reserved, and if so again the process proceeds to step 525 where the register is not locked. However, if at step 510 it is determined that the register is not already reserved, then it is next determined at step 515 whether an issue stage stall condition exists for any other reason, and if so the register is not locked. In addition to conditions such as the relevant execution pipeline not being ready to receive the operation seeking to be scheduled by the issue stage circuitry 240, other conditions that may be detected at step 515 could be a determination that any other register seeking to be locked or reserved by the issue stage circuitry 240 at that time is not available to be locked/reserved, respectively.

However, assuming it is determined that there are no other conditions that would dictate an issue stage stall, then the register is locked at step 520. If the register is not locked at step 525, this will be apparent to the issue stage circuitry 240, since it will receive a stall signal from the scoreboard circuitry.

Figure 9:
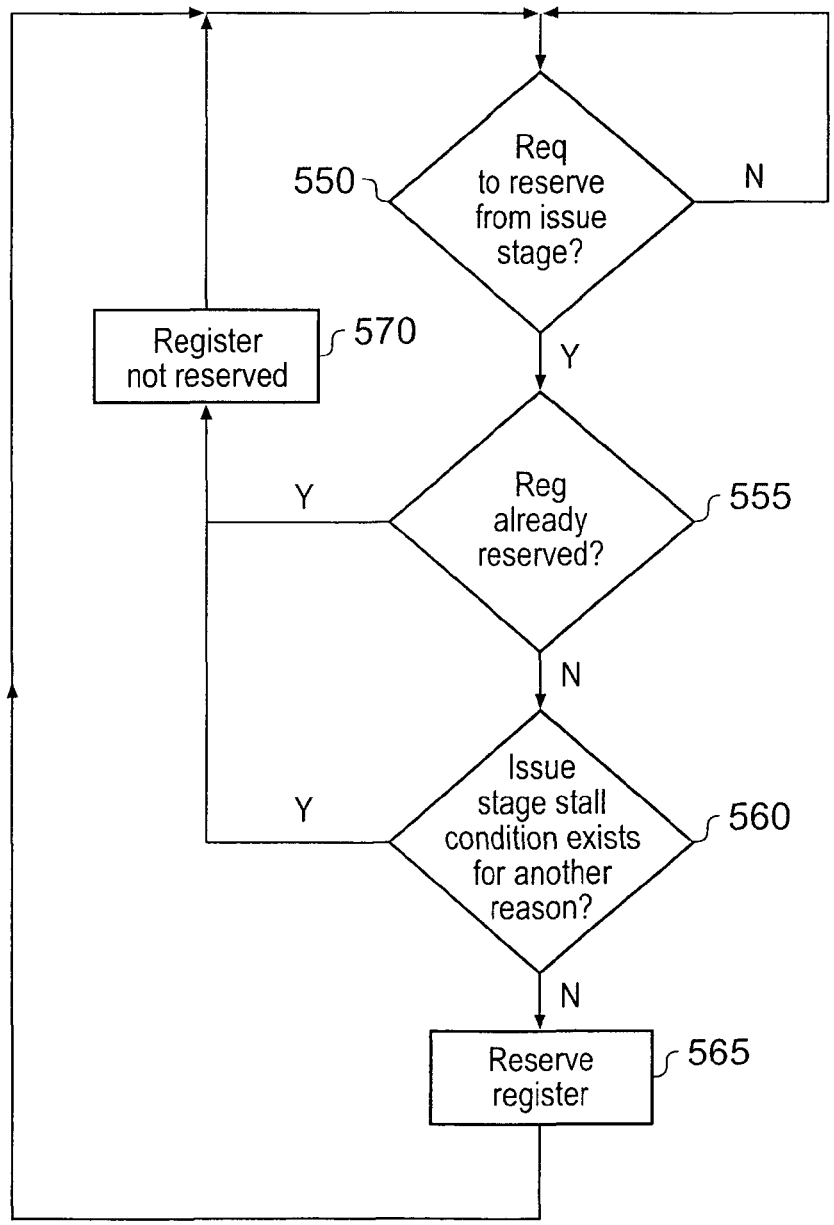
FIG. 9 is a flow diagram illustrating the steps performed by the control logic of FIG. 6 upon receipt of a reserve request from the issue stage circuitry in accordance with one embodiment of the present invention.

FIG. 9 is a similar flow diagram illustrating how the control logic 400 handles a request to reserve a register sent by the issue stage circuitry 240. At step 550, it is determined whether such a request has been received, and if so it is determined at step 555 whether the register is already reserved. If so, then at step 570 the register is not reserved. However, if the register has not already been reserved, then it is determined at step 560 whether any other condition exists requiring an issue stage stall, and if so again the register is not reserved. As with FIG. 8, in addition to conditions such as the relevant execution pipeline not being ready to receive the operation seeking to be scheduled by the issue stage circuitry 240, other conditions that may be detected at step 560 could be a determination that any other register seeking to be locked or reserved by the issue stage circuitry 240 at that time is not available to be locked/reserved, respectively. However, if such a condition does not exist then the register is reserved at step 565. It should be noted that in determining whether to allow a register to be reserved or not, it is immaterial whether that register has already been locked. As with the discussion of FIG. 8, if the register is not reserved at step 570, this will be apparent to the issue stage circuitry, since it will receive a stall signal from the scoreboard circuitry 245.

Figure 10:
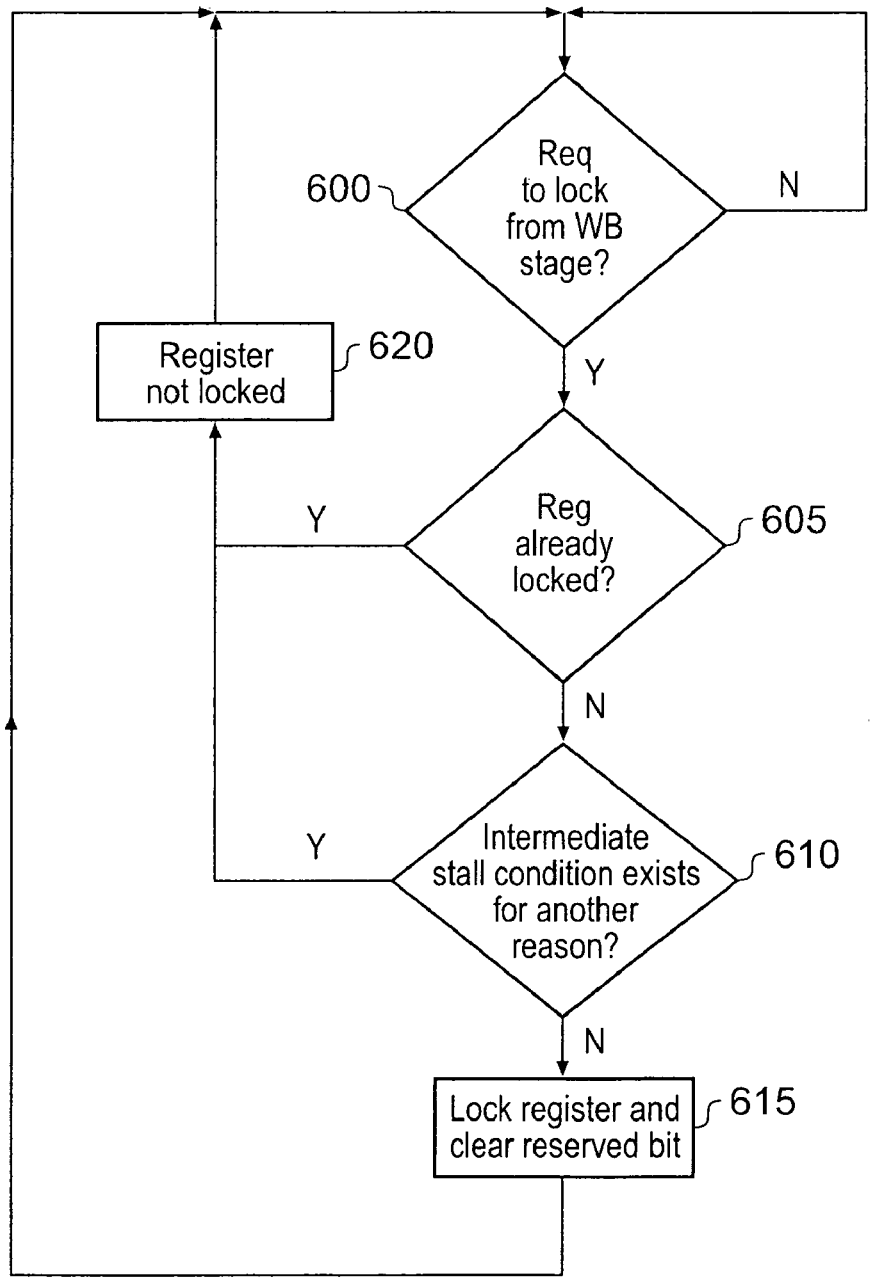
FIG. 10 is a flow diagram illustrating the steps performed by the control logic of FIG. 6 upon receipt of a lock request from the write back stage in accordance with one embodiment of the present invention.

FIG. 10 is a flow diagram illustrating how the control logic 400 handles a lock request issued by the write back stage. Once such a lock request has been detected at step 600, it is determined at step 605 whether the specified register is already locked, and if so the register is not locked step 620. However, if the register is not already locked, then it is determined at step 610 whether there is some other intermediate stall condition, and if so again the register is not locked. However, assuming no other stall condition exists, then the register is locked at step 615 and the reserved bit for that register is cleared. If the register is not locked at step 620, this will be apparent to the write back stage, since it will receive some stall indication from the scoreboard circuitry 245.

FIGS. 11A and 11B illustrate the potential speed benefits that can be derived from using the reservation mechanism discussed earlier with reference to FIG. 5. In particular, the examples illustrate execution of two instructions, namely a floating point division instruction followed by a floating point multiply-accumulate instruction. FIG. 11A illustrates the locked status of the register R1 within the scoreboard logic 245 using the technique of FIG. 4. Register R1 is used as the destination register for the division instruction and for the subsequent multiply-accumulate instruction. At the time the division instruction is scheduled by the issue stage 240, the register R1 will be locked at point 700, and will remain locked for the entirety of the execution of the division operation within the divide/square root pipeline 256. During this period, this will give rise to an interlock condition when seeking to schedule the subsequent multiply-accumulate instruction, and accordingly execution of the multiply-accumulate instruction cannot begin.

When the required division operation is completed, register R1 will be unlocked at point 705, which then enables it one cycle later at point 710 to be locked by the issue stage circuitry 240 to allow the first operation of the multiply-accumulate instruction, namely the multiply operation, to be scheduled into the multiply pipeline 252. At point 715, the write back stage of the multiply pipeline 252 will then schedule the add operation into ALU pipeline 254, and at this time register R1 will remain locked. When the write back stage of the ALU pipeline 254 is reached, and the result of the multiply-accumulate calculation is hence computed, that result will be written to the destination register R1, and register R1 will be unlocked at point 720.

Considering now FIG. 11B, this illustrates the status of the locked flag and the reserved flag for register R1 when employing the technique of FIG. 5. The division operation is scheduled in the same way, and accordingly register R1 is locked at point 700 and unlocked at point 705. One cycle after the division instruction is scheduled, the issue stage circuitry 240 will seek to schedule the multiply operation of the multiply-accumulate instruction. As shown, the multiply accumulate instruction specifies two source registers R2 and R3, and one destination register R1. The registers R2 and R3 form the source registers for the multiply operation, and no destination register is specified for the multiply operation. Instead, the result of the multiply operation is used directly as one of the source operands for the accumulate operation, the other source operand being register R1 itself, and the destination register for the accumulate operation again being register R1. Assuming register R1 has not already been reserved, then the fact that is has been locked by the preceding division instruction does not prevent the multiply operation being scheduled at point 750, assuming the contents of register R2 and R3 are available for reading by that multiply operation. When the multiply operation reaches the write back stage of the multiply pipeline 252 at point 755, that write back stage will then seek to schedule the add operation but will not be able to do so because an interlock will be detected with respect to register R1 during the period between point 755 and point 760. Once the register R1 has been unlocked at point 705, then one cycle later the write back stage of the multiply pipeline 252 can lock register R1 at point 770, at which point the reserved field associated with register R1 is cleared at point 780. The add operation can then proceed in the ALU pipeline 254, and when the write back stage of the ALU pipeline 254 is reached, and the accumulate result is hence calculated, register R1 can then be unlocked at point 790.

As will be seen by a comparison of FIGS. 11A and 11B, the use of the reservation mechanism can give rise to significant improvements in performance by allowing the execution pipelines to begin executing the operations required by a complex instruction earlier than might otherwise be the case having regards to interlock conditions that would arise if all of the appropriate registers need to be locked before the first operation could be sent to the relevant execution pipeline from the issue stage circuitry 240.

Figure 12:
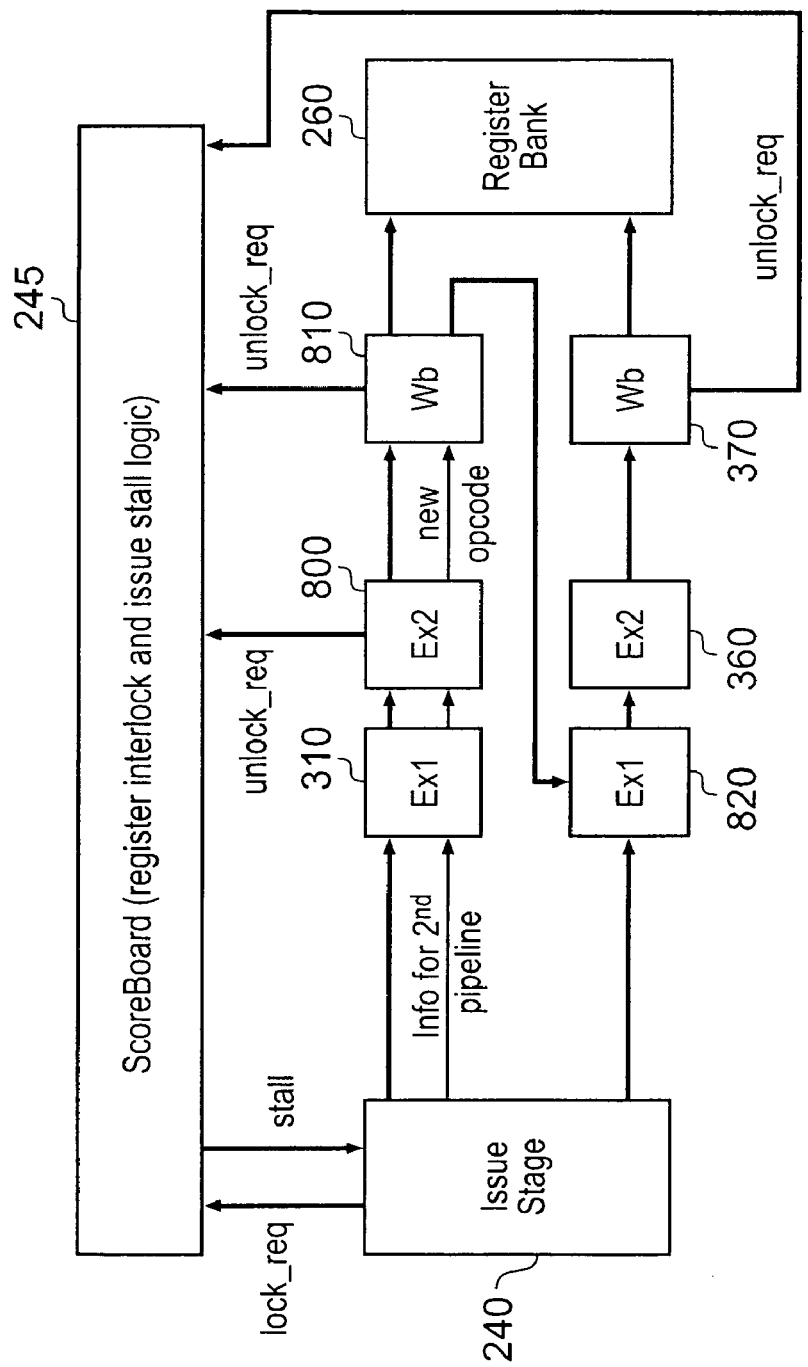
FIG. 12 schematically illustrates a mechanism for handling complex instructions in accordance with another alternative embodiment of the present invention.
Figure 13:
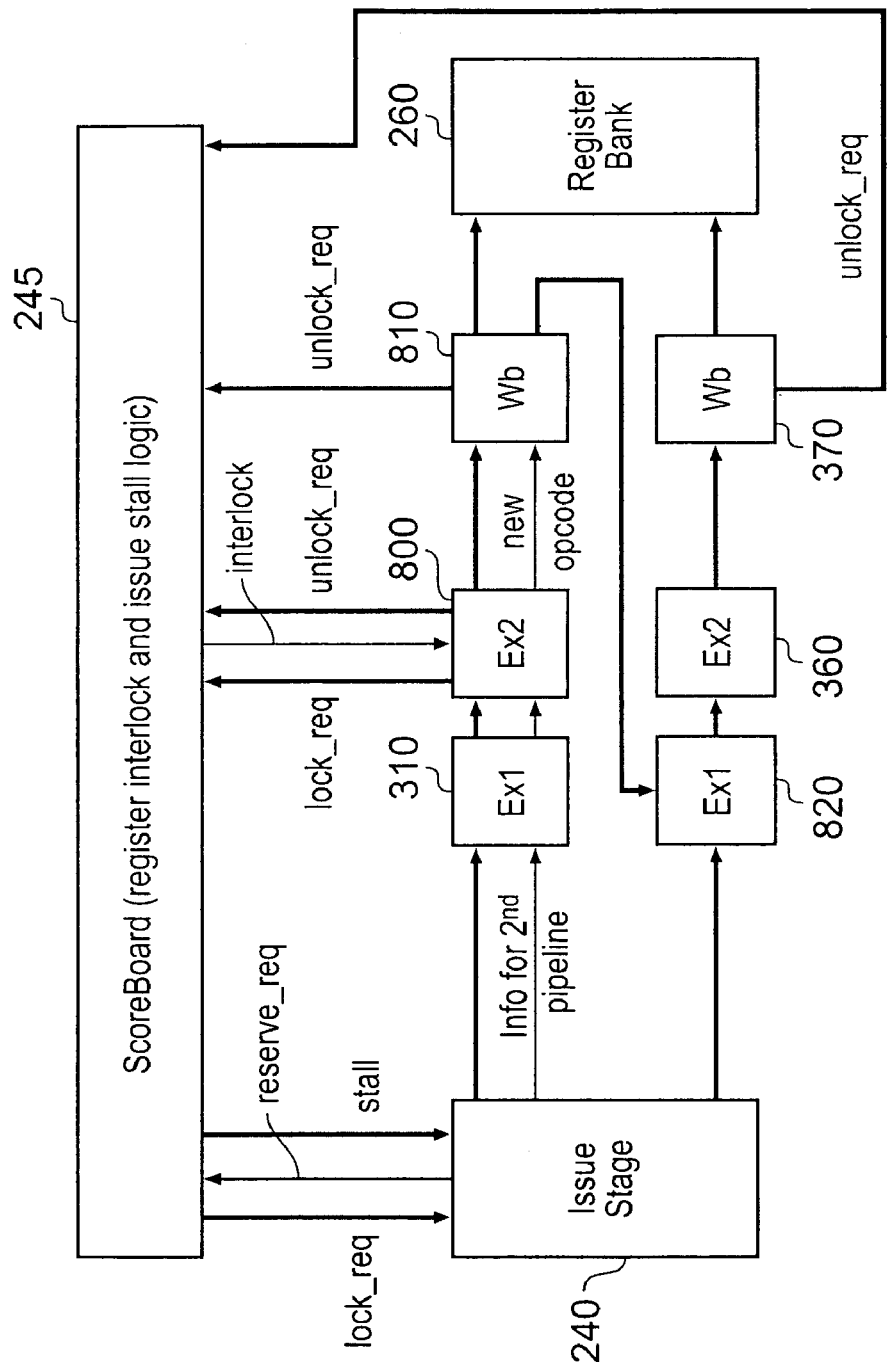
FIG. 13 schematically illustrates a mechanism for handling complex instructions in accordance with another alternative embodiment of the present invention.

FIGS. 12 and 13 illustrate two further embodiments of the present invention where the write back stage of a first pipeline is merged with the first execute stage of a second pipeline. In particular, FIG. 12 is a variation of the embodiment described earlier with reference to FIG. 4, in the situation where the write back stage 810 of the first pipeline is merged with the first execute stage 820 of the second pipeline. Similarly, FIG. 13 is a variant of the earlier described FIG. 5 embodiment, where again the write back stage 810 of the first pipeline is merged with the first execute stage of 820 of the second pipeline. In these embodiments, the execute 2 stage 800 of the first pipeline is the predetermined pipeline stage used to schedule the second operation, and hence will be arranged to reference the scoreboard circuitry 245 to determine whether the second operation can proceed. In the embodiment of FIG. 13, the execute 2 stage 800 is able in an analogous manner to the write back stage 330 of FIG. 5, on determining that the second operation can proceed, to issue a lock request to seek to lock and unreserve the destination register for the second operation, and at the same time the source registers for the second operation can be unreserved. In both the FIG. 12 and FIG. 13 embodiments, the execute 2 stage 800 can be arranged to issue unlock requests to unlock any specified source register(s) for the second operation. In addition the write back stage 810 retains the ability of issue unlock requests for destination registers, and also handles simple instructions in the usual manner.

When the execute 2 stage 800 has performed the required scheduling of the second operation, it issues the necessary control signals to the combined write back 810/execute 1 820 stage, including the opcode for the second operation. The necessary information about the result of the first operation is also forwarded to the combined write back 810/execute 1 820 stage to enable the write back portion 810 to perform its usual processing in connection with the result of the first operation. A data path is provided between the write back portion 810 and the execute 1 portion 820 of the merged pipeline stage to allow the result of the first operation to be routed into the execute 1 portion used to begin execution of the second operation.

By the above approach, the operation of the write back stage 810 and the first execute stage 820 can hence be merged into a single clock cycle. When the combined write back 810/execute 1 820 stage is ready to receive the next operation, and no other stall conditions exist, the necessary control signals are routed from the second execute stage 800 to the combined write back 810/execute 1 820 stage, and the arbitration logic will ensure that at that time the issue stage cannot issue any operation to the second execution pipeline, the issue circuitry seeing the second execution pipeline as being not ready to receive a new operation. This not ready status of the second execution pipeline continues whilst the second operation is being processed in the execute 1 portion 820.

The ability to merge the write back stage 810 and the first execute stage 820 into a single clock cycle arises from the ability to deposit the result data from the write back stage directly into the first execute stage. Often the execution pipelines work on data in an internal format different from the format in which the data is stored in the registers (as for example often is the case when processing floating point values), and hence when reading a source operand, the source operand data is typically translated from the normal register format into the internal format. Similarly, when the result is written back to the register bank, it is necessary to translate the data back from the internal format to the normal format. By enabling the data to be deposited directly from the write back stage into the first execute stage without any reference to the register bank, this avoids the need to translate the result data back to normal format, then to translate it again into internal format prior to the second operation beginning, and this saving in complexity can allow the write back stage 810 of the first pipeline and the first execute stage 820 for the second pipeline to be merged. In embodiments where it is possible to merge the write back stage of the first pipeline and the first execute stage of the second pipeline, this can give rise to a further one cycle improvement in execution time for complex instructions.

In many embodiments, the actual volume of information that needs to be routed through the first pipeline to enable the write back stage to schedule and initiate the second operation of the complex instruction can be reduced. For example, in many complex instructions, it is often the case that the result value of the first operation is one of the source operands of the second operation. There is hence no need to write the result to the register bank in between the two constituent operations. However, as the execution pipeline handling the first operation of the complex instruction is also able to handle operations of simple instructions where those operations will specify a destination register, the normal control lines into that pipeline will be available to accommodate a destination index. Hence, the destination index of the second operation can be passed directly into the first pipeline to be forwarded then onto the second pipeline without any increase in the volume of control signals that need to be issued to the first execution pipeline. Further, it is often the case with complex instructions that although the source operands for the second operation may be different from those used by the first operation, at least one of them is typically the result of the first operation, and accordingly this reduces the amount of additional information that needs to be forwarded into the first pipeline to enable it to have sufficient information to schedule and initiate the second operation.

Hence, some of the information required to be forwarded to the first pipeline to enable it to schedule the second operation can be coded in such a manner so as to avoid the need to propagate a large amount of information into the first pipeline to enable it to schedule that second operation. This information can then be decoded in either the write back stage of the first pipeline, or a preceding pipeline stage such as the execute two stage 800, so that the information is then available to pass to the second pipeline when the second operation is scheduled.

From the above description of embodiments of the present invention, it will be seen that such embodiments provide a particularly efficient and effective mechanism for handling complex instructions within a data processing apparatus, which avoids the need for the provision of dedicated execution pipelines for handling the complex instructions, and avoids increasing the complexity of the issue stage circuitry 240. Instead, the issue stage circuitry 240 can schedule the first operation of a complex instruction, and then delegate responsibility for scheduling subsequent operations of that complex instruction to the predetermined pipeline stage(s) of one or more execution pipelines. Additionally, if as described in connection with certain embodiments a reservation mechanism is used in association with the scoreboard circuitry, significant performance improvements can be realized with regards to the execution of complex instructions. A performance improvement can also be realized if measures are taken to enable the write back stage in a first pipeline to be merged with the first execute stage in a second pipeline as described with reference to the embodiments of FIGS. 12 and 13.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for executing instructions defining operations to be performed by the data processing apparatus, the instructions including at least one complex instruction defining a sequence of operations to be performed, and the data processing apparatus comprising:
   a plurality of execution pipelines, each execution pipeline having a plurality of pipeline stages and arranged to perform at least one associated operation; and
   issue circuitry for interfacing with the plurality of execution pipelines and configured to schedule performance of the operations defined by said instructions, wherein for said at least one complex instruction, the issue circuitry is configured to schedule a first operation in said sequence and to issue control signals to one of the execution pipelines with which that first operation is associated, the control signals including an indication of each additional operation in the sequence, wherein when performance of the first operation reaches a predetermined pipeline stage in said one of the execution pipelines, that predetermined pipeline stage is configured to schedule a next operation in the sequence and to issue additional control signals to a further one of said execution pipelines with which that next operation is associated in order to cause that next operation to be performed.

2. A data processing apparatus as claimed in claim 1, further comprising:
   a register bank comprising a plurality of registers accessible to said plurality of execution pipelines when performing said operations, each register being specifiable by an operation as a source register for storing an input value for that operation or a destination register for storing a result value produced by that operation; and
   scoreboard circuitry for maintaining a record of registers used by operations being performed in said plurality of execution pipelines;
   when scheduling an operation, the issue circuitry initiating one or more checks to determine whether that operation can currently be performed, including referencing the scoreboard circuitry to check that the operation can proceed having regard to the registers to be accessed;
   when scheduling the first operation of said at least one complex instruction, the issue circuitry referencing the scoreboard circuitry taking into account all registers specified by the sequence of operations defined by that complex instruction.

3. A data processing apparatus as claimed in claim 2, wherein:
   for each register in the register bank the scoreboard circuitry maintains a locked field which is set to identify that the register has been locked for use by one of the operations; and
   for said at least one complex instruction the issue circuitry being arranged when scheduling the first operation to issue a lock request to the scoreboard circuitry to lock any registers specified by the sequence of operations other than the source registers for the first operation in the sequence, the registers specified by the lock request being locked provided that the first operation can currently be performed and the specified registers are available to be locked, and the issue circuitry only issuing the control signals to said one of the execution pipelines with which the first operation is associated once all registers specified by the lock request have been locked.

4. A data processing apparatus as claimed in claim 3, wherein:
   when scheduling the next operation, the predetermined pipeline stage initiating one or more checks to determine whether that next operation can currently be performed, and if the next operation can currently be performed the predetermined pipeline stage being arranged to unlock any source registers which are to be used by the next operation.

5. A data processing apparatus as claimed in claim 2, wherein:
   for each register in the register bank the scoreboard circuitry maintains a locked field which is set to identify that the register has been locked for use by one of the operations, and a reserved field which is set to identify that the register has been reserved for use by one of the operations, the reserved field being settable even if the locked field for the same register is currently set;
   for said at least one complex instruction the issue circuitry being arranged when scheduling the first operation to issue a reserve request to the scoreboard circuitry to reserve any registers specified by the sequence of operations other than the source registers for the first operation in the sequence, the registers specified by the reserve request being reserved provided that the first operation can currently be performed, and the specified registers are available to be reserved, the issue circuitry issuing the control signals to said one of the execution pipelines with which the first operation is associated once all registers specified by the reserve request have been reserved, even if one or more of those registers is currently locked.

6. A data processing apparatus as claimed in claim 5, wherein if a destination register is specified for said first operation, the issue circuitry is arranged to issue a lock request for that destination register rather than a reserve request.

7. A data processing apparatus as claimed in claim 5, wherein:
   when scheduling the next operation, the predetermined pipeline stage initiates one or more checks to determine whether that next operation can currently be performed, and if the next operation can currently be performed the predetermined pipeline stage is arranged to unreserve any source registers which are to be used by the next operation, and to issue a lock request to the scoreboard circuitry for at least any destination register specified for said next operation, the scoreboard circuitry being arranged in response to the lock request, provided that the associated lock field has not already been set by an earlier operation, to set the associated locked field and to clear the associated reserved field for each register specified by the lock request, the predetermined pipeline stage only issuing the additional control signals to said further one of said execution pipelines once all registers specified by the lock request have been locked.

8. A data processing apparatus as claimed in claim 1, wherein if said at least one complex instruction defines a sequence of more than two operations, then when performance of each operation in the sequence reaches a predetermined pipeline stage in the execution pipeline performing that operation, that predetermined pipeline stage is arranged to schedule a following operation in the sequence and to issue additional control signals to the execution pipeline with which that following operation is associated in order to cause that following operation to be performed.

9. A data processing apparatus as claimed in claim 1, further comprising scheduling arbitration circuitry for arbitrating between the issue circuitry scheduling and the predetermined pipeline stage scheduling.

10. A data processing apparatus as claimed in claim 9, wherein if both the issue circuitry and the predetermined pipeline stage are seeking to schedule operations to the same execution pipeline at the same time, the scheduling arbitration circuitry gives priority to the operation being scheduled by the predetermined pipeline stage.

11. A data processing apparatus as claimed in claim 10, wherein multiple of said plurality of execution pipeline stages each include a predetermined pipeline stage for performing scheduling of operations defined by complex instructions, and if multiple predetermined pipeline stages are seeking to schedule operations of different complex instructions to the same execution pipeline at the same time, the scheduling arbitration circuitry gives priority to the operation of the complex instruction whose first operation was first scheduled by the issue circuitry.

12. A data processing apparatus as claimed in claim 9, wherein said scheduling arbitration circuitry is provided within scoreboard circuitry used to maintain a record of registers used by operations being performed in said plurality of execution pipelines.

13. A data processing apparatus as claimed in claim 1, wherein one pipeline stage in said one of the execution pipelines is merged with one pipeline stage in said further one of said execution pipelines, thereby reducing execution time of the at least one complex instruction.

14. A data processing apparatus as claimed in claim 13, wherein said one pipeline stage in said one of the execution pipelines is a write back pipeline stage used to output a result of the first operation.

15. A data processing apparatus as claimed in claim 14, wherein the predetermined pipeline stage is a pipeline stage prior to the write back pipeline stage.

16. A method of executing within a data processing apparatus instructions that include at least one complex instruction, each complex instruction defining a sequence of operations to be performed, the data processing apparatus having a plurality of execution pipelines, each execution pipeline having a plurality of pipeline stages and arranged to perform at least one associated operation, the method comprising the steps of:

employing issue circuitry to interface with the plurality of execution pipelines and scheduling performance of the operations defined by said instructions;

for said at least one complex instruction, causing the issue circuitry to schedule a first operation in said sequence and to issue control signals to one of the execution pipelines with which that first operation is associated, the control signals including an indication of each additional operation in the sequence; and when performance of the first operation reaches a predetermined pipeline stage in said one of the execution pipelines, causing that predetermined pipeline stage to schedule a next operation in the sequence and to issue additional control signals to a further one of said execution pipelines with which that next operation is associated in order to cause that next operation to be performed.

* * * * *